US008058853B2

(12) United States Patent
Murota

(10) Patent No.: US 8,058,853 B2
(45) Date of Patent: Nov. 15, 2011

(54) VOLTAGE OUTPUT CIRCUIT, INTEGRATED CIRCUIT AND ELECTRONIC DEVICE

(75) Inventor: Kazuaki Murota, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 280 days.

(21) Appl. No.: 12/312,420

(22) PCT Filed: Nov. 15, 2007

(86) PCT No.: PCT/JP2007/072164
§ 371 (c)(1),
(2), (4) Date: May 8, 2009

(87) PCT Pub. No.: WO2008/062706
PCT Pub. Date: May 29, 2008

(65) Prior Publication Data
US 2010/0045251 A1    Feb. 25, 2010

(30) Foreign Application Priority Data
Nov. 20, 2006   (JP) .................................. 2006-313489

(51) Int. Cl.
*G05F 1/577*    (2006.01)
(52) U.S. Cl. ....................................................... 323/267
(58) Field of Classification Search .................... 363/63, 363/74; 323/265, 267, 282, 349, 351
See application file for complete search history.

(56) References Cited

U.S. PATENT DOCUMENTS

| 5,686,860 | A  | * | 11/1997 | Matyas ........................... 327/540 |
| 6,320,435 | B1 | * | 11/2001 | Tanimoto ....................... 327/156 |
| 6,335,893 | B1 | * | 1/2002  | Tanaka et al. ................. 365/226 |
| 6,388,506 | B1 | * | 5/2002  | Voo ................................ 327/536 |
| 6,535,435 | B2 | * | 3/2003  | Tanaka et al. ............. 365/189.09 |
| 7,401,237 | B2 |   | 7/2008  | Hara |
| 7,633,824 | B2 | * | 12/2009 | Kato .............................. 365/226 |
| 7,733,160 | B2 | * | 6/2010  | Morita .......................... 327/536 |
| 2008/0244310 | A1 |  | 10/2008 | Hara |
| 2010/0171544 | A1 | * | 7/2010 | Seo ................................ 327/536 |

FOREIGN PATENT DOCUMENTS

| JP | U-62-38085   | 3/1987 |
| JP | A-6-269162   | 9/1994 |
| JP | A-9-65653    | 3/1997 |
| JP | A-2005-168247 | 6/2005 |
| JP | A-2005-323479 | 11/2005 |

* cited by examiner

*Primary Examiner* — Adolf Berhane
(74) *Attorney, Agent, or Firm* — Oliff & Berridge, PLC

(57) ABSTRACT

A voltage output circuit has a controller controlling ON/OFF switching of a first switch which switches ON/OFF voltage transformation by a first charge pump circuit in order to turning a first voltage outputted from a first voltage output terminal into a desired value, a second charge pump circuit transforming the voltage with the use of an electric power obtained by storing an input voltage according to ON/OFF of the first switch and outputting the voltage as a second voltage, a second switch selecting whether to store the electric power used for transformation by the second charge pump circuit, and a switching unit switching ON/OFF the second switch on the basis of the second voltage outputted from a second voltage output terminal. The circuit having a simple configuration can transform the input voltage and output desired positive and negative voltage, while accomplishing a reduction in cost and size of the circuit.

10 Claims, 18 Drawing Sheets

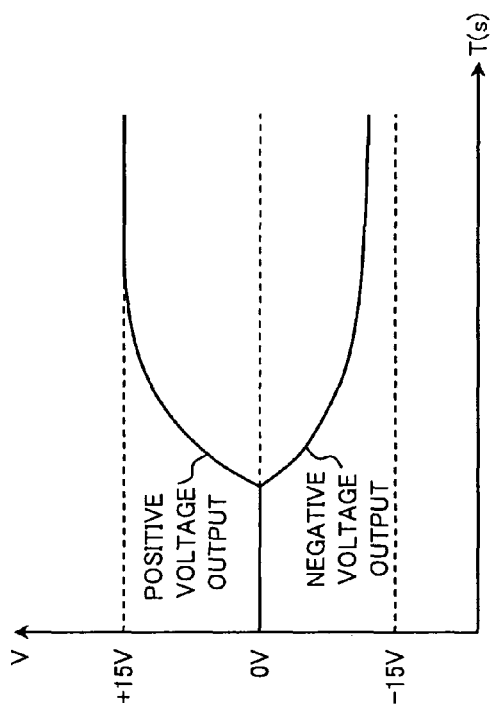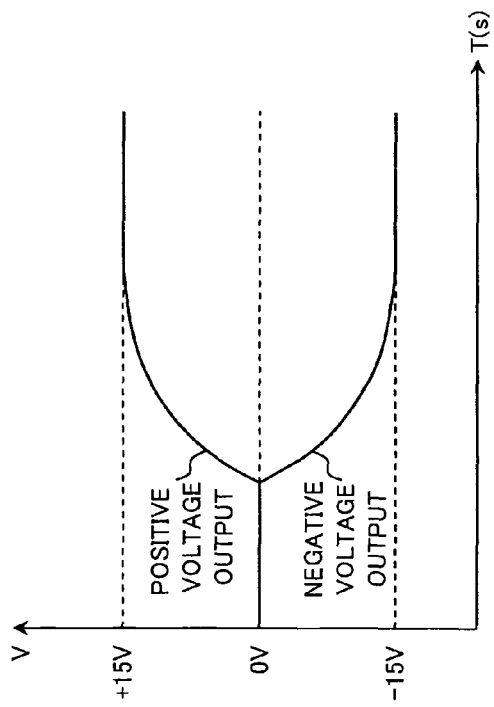

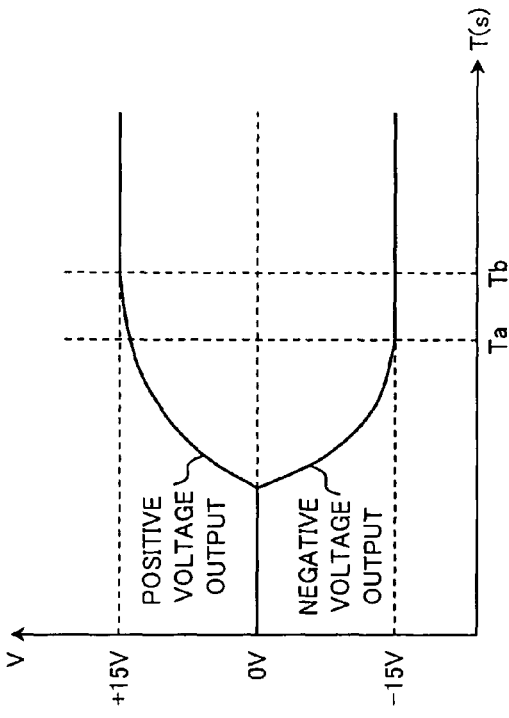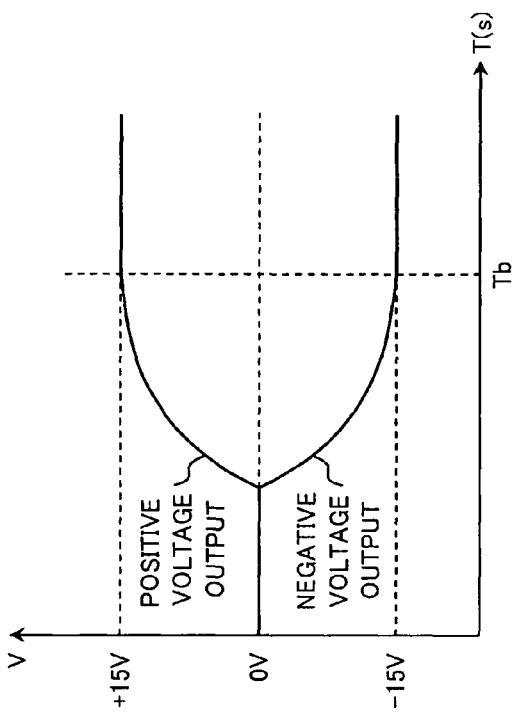

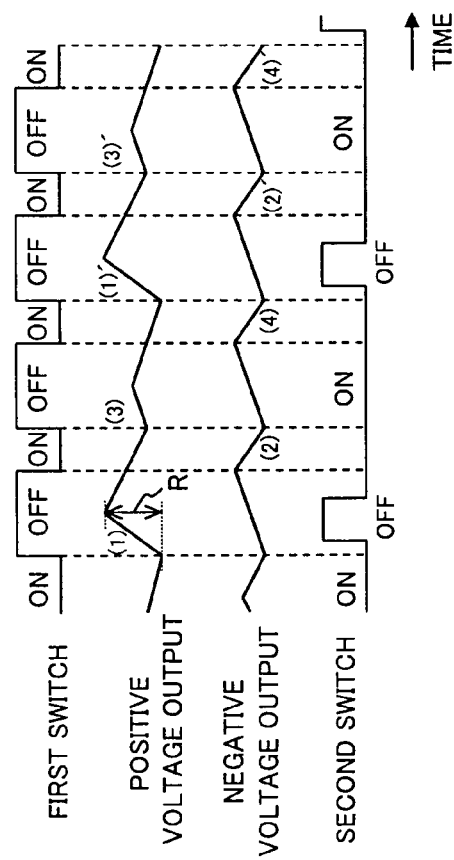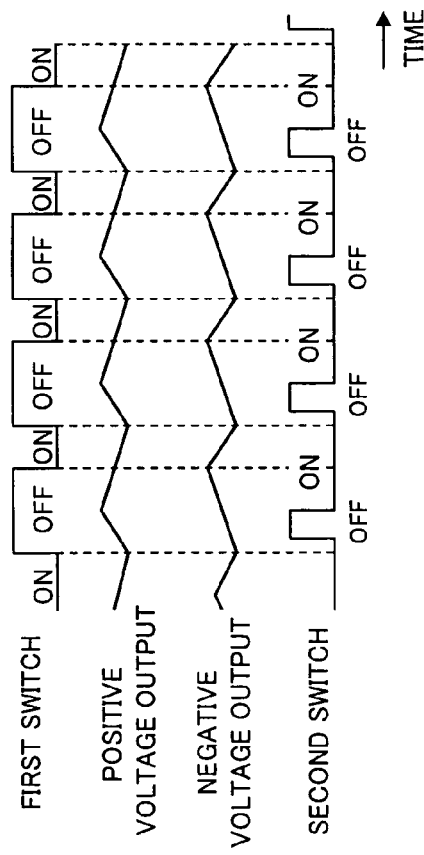

US 8,058,853 B2

VOLTAGE OUTPUT CIRCUIT, INTEGRATED CIRCUIT AND ELECTRONIC DEVICE

TECHNICAL FIELD

The present invention relates to a voltage output circuit provided in an electronic device, particularly, to a positive/negative voltage output circuit.

BACKGROUND ART

There has been a positive/negative voltage output circuit 100 as shown in, for example, FIG. 22, as a positive/negative output circuit of an electronic device (for example, audio equipment) which requires two power supplies of positive and negative voltages as a power supply. The positive/negative voltage output circuit 100 generates a positive voltage and a negative voltage with the use of two switching controllers 110 and 120.

In concrete, the positive/negative voltage output circuit 100 comprises a boost positive voltage output circuit 100-1 which boosts an input voltage (denoted as "Vin" in the drawing) inputted from the input terminal 101 and outputs a positive voltage from a positive voltage output terminal 100-2, and a negative voltage output circuit 102 which drops the input voltage and outputs a negative voltage from a negative voltage output terminal 103.

The boost positive voltage output circuit 100-1 comprises a boost switching controller 110; a switching element 115; a coil 116; a diode 117 for rectification; a capacitor 118 for smoothing and resistors 119a and 119b for output voltage feedback. The boost voltage switching controller 110 switches ON and OFF the switching element 115 to boost the input voltage.

The boost switching controller 110 comprises an error amplifier 112 which detects an error between a resistance division value of positive voltage outputs yielded by the resistors 119a and 119b for output voltage feedback and a reference voltage 111; a triangular wave oscillator 113 which generates a triangular wave; and a PWM (Pulse Width Modulation) control circuit 114 which controls the switching between ON and OFF of the switching element 115 on the basis of the triangular wave generated by the triangular wave oscillator 113 and an error signal fed from the error amplifier 112.

The PWM control circuit 114 controls a time period during which the switching element 115 is ON (ONDuty) so that the resistance division value by the resistors 119a and 119b for output voltage feedback becomes the same as the reference voltage 111, whereby the boost positive voltage output circuit 100-1 boosts the input voltage and outputs a desired positive voltage (Vo1) from the positive voltage output terminal 102.

On the other hand, the negative voltage output circuit 100-2 is configured almost similarly to the boost positive voltage output circuit 100-1. Namely, the negative voltage output circuit 100-2 comprises a negative voltage switching controller 120; a switching element 125; a coil 126; a diode 127 for rectification; a capacitor 128 for smoothing; and resistors 129a and 129b for output voltage feedback. The negative voltage switching controller 120 switches ON and OFF the switching element 125 to drop the input voltage.

The negative voltage switching controller 120 comprises an error amplifier 122 which detects an error between a resistance division value of a negative voltage output and a reference voltage 129c yielded by the resistors 129a and 129b for output voltage feedback, and a reference voltage 121; a triangular wave oscillator 123 which generates a triangular wave; and a PWM control circuit 124 which controls a switching between ON and OFF of the switching element 125 on the basis of the triangular wave generated by the triangular wave oscillator 123 and an error signal fed from the error amplifier 122.

The PWM control circuit 124 controls a time period during which the switching elements 125 is ON so that the resistance division value yielded by the resistors 129a and 129b for output voltage feedback is the same as a reference voltage 121, whereby the negative voltage output circuit 100-2 drops the input voltage and outputs a desired negative voltage (Vo2) from a negative voltage output terminal 103.

However, the known positive/negative voltage output circuit 100 shown in FIG. 22 requires two sets of expensive switching controllers 110 and 120 and coils 116 and 126, which causes an increase in cost and size of the circuit.

To overcome the above disadvantage, there is proposed a composite power supply unit which outputs both a positive voltage and a negative voltage with one controller and one coil (see Patent Document 1 below).

Patent Document 1: Japanese Patent Application Laid-Open Publication No. 2005-168247

DISCLOSURE OF INVENTION

According to the technique disclosed in the above-mentioned patent document 1, since a polarity reversal type switching power circuit for outputting a negative voltage and a charge pump type booster circuit for outputting a positive voltage are controlled by one controller and one switch, it is necessary to feedback not only the outputted negative voltage and positive voltage but also an electric current flowing through the coil, and it is also necessary to control the switch by operating the negative voltage, the positive voltage and the electric current, which causes an increase in complexity and cost of the controller, and an increase in size of the apparatus because a mechanism for feeding back the electric current of the coil is newly required.

Moreover, since one controller and one switch control both the negative voltage and the positive voltage, the control can be unstable when a difference in value between the negative voltage and the input voltage and a difference in value between the positive voltage and the input voltage is large or when the load electric current is varied.

In the light of the above disadvantages, an object of the present invention is to be able to output desired positive voltage and negative voltage by transforming the input voltage with a simple configuration, and to attain a reduction in cost and size of the circuit.

Means for Solving the Problem

According to an aspect of the present invention, a voltage output circuit outputting a first voltage and a second voltage based on an input voltage inputted from an input terminal, comprises a coil disposed between the input terminal and two output terminals which are a first voltage output terminal outputting the first voltage and a second voltage output terminal outputting the second voltage, respectively, a first charge pump circuit disposed between the coil and the first voltage output terminal, and transforming the input voltage to output the transformed input voltage as the first voltage, a first switch disposed between a ground and a connection point connecting the coil to the first charge pump circuit, and switching between ON and OFF of the transformation by the first charge pump circuit, a controller that controls the switching between ON and OFF of the first switch in order to turn the first voltage to be outputted from the first voltage output terminal into a desired value, a second charge pump circuit disposed between the second voltage output terminal and a connection point connecting the coil to the first switch, and transforming the input voltage by using a stored electric power according to ON/OFF of the first switch to output the transformed input voltage as the second voltage, a second switch disposed between the second charge pump circuit and a ground, and selecting whether or not to store the electric power to be used to transform the voltage in the second charge pump circuit, and a switching unit that switches between ON and OFF of the second switch based on the second voltage outputted from the second voltage output terminal.

The first charge pump circuit outputs a positive voltage obtained by boosting the input voltage as the first voltage, while the second charge pump circuit outputs a negative voltage obtained by dropping the input voltage as the second voltage.

The first charge pump circuit has a first capacitor storing an electric power so as to boost the input voltage by using the electric power stored in the first capacitor, the second charge pump circuit has a second capacitor storing an electric power so as to drop the input voltage by using the electric power stored in the second capacitor, and a capacity value of the second capacitor is greater than a capacity value of the first capacitor when a load power of the second voltage output terminal is greater than a load power of the first voltage output terminal.

The switching unit performs the switching between ON and OFF of the second switch based on a resistance division value at a connection point between two resistors disposed in series between the first voltage output terminal and the second voltage output terminal. In this case, a capacitor is disposed in parallel to one of the two resistors which is disposed on the side of the first voltage output terminal.

The voltage output circuit further comprises a second voltage abnormality detector that detects second voltage abnormality based on the second voltage outputted from the second voltage output terminal, and a first timer that detects that the second voltage abnormality detector continuously detects the second voltage abnormality for a predetermined time, wherein the controller switches OFF the first switch when the first timer detects that the second voltage abnormality detector continuously detects the second voltage abnormality for the predetermined time.

The voltage output circuit still further comprises an excess current detector that detects excess current from the first input terminal, wherein the first timer detects that the excess current detector continuously detects the excess current for a predetermined time, and the controller switches OFF the first switch when the first timer detects that the excess current detector continuously detects the excess current for the predetermined time.

The voltage output circuit still further comprises a first voltage output short-circuit detector that detects first voltage output short-circuit based on the first voltage outputted from the first voltage output terminal, and a second timer that detects elapse of a predetermined time when the first voltage output short-circuit detector detects the first voltage output short-circuit, wherein the controller latches the first switch onto an OFF state when the second timer detects elapse of the predetermined time after the first voltage output short-circuit detector detects the first voltage output short-circuit.

According to another aspect of the invention, an integrated circuit comprises part or all of the voltage output circuit aforementioned.

According to still another aspect of the invention, an electronic device comprises the voltage output circuit aforementioned, or the integrated circuit aforementioned.

Effects of the Invention

According to this invention, the second charge pump circuit transforms the voltage with the use of an electric power obtained by storing the input voltage according to ON/OFF of the first switch and outputs the transformed voltage as the second voltage, and the switching unit selects whether to store the electric power used for transformation in the second charge pump circuit. This makes it possible to transform the input voltage and to output desired first and second voltages with a quite simple configuration, thereby accomplishing a reduction in cost and size of the circuit.

Namely, when the second voltage is outputted, the second charge pump circuit operates according to ON/OFF of the first switch, and the switching unit selects whether to store an electric power used for transformation in the second charge pump circuit. As this, the simple configuration having only one coil and one control circuit makes it possible to stably output the first voltage (positive voltage) and the second voltage (negative voltage) at desired values, irrespective of the load currents.

The capacity value of the second capacitor in the second charge pump circuit is larger than the capacity value of the first capacitor in the first charge pump circuit. For this, even when the power consumption of a load on the first charge pump circuit is larger than the power consumption of a load on the second charge pump circuit, the second voltage can be transformed to a desired value, with certainty.

The switching unit switches ON/OFF the second switch on the basis of a resistance division value at a connection point between two resistors disposed in series between a connection point connecting the first voltage output terminal to the first charge pump circuit and a connection point connecting the second voltage output terminal to the second charge pump circuit. For this, even when the capacity value of the second capacitor is large than that of the first capacitor, the first voltage and the second voltage can simultaneously reach desired values.

A capacitor disposed in parallel to one of the above two resistors, which is arranged on the side of the first voltage output terminal, can forcibly change the input to the switching unit when the first switch is turned from ON to OFF by the capacitor, thereby to turn OFF the second switch in synchronization with that the first switch turns OFF. Whereby, it is possible to synchronize ON/OFF of the first switch with ON/OFF of the second switch to reduce output ripple of the first voltage.

The controller switches OFF the first switch when the first timer detects that the second voltage abnormality detector continuously detects the second voltage abnormality for a predetermined time. For this, it is possible to prevent the voltage output circuit from breaking in case of a failure due to output short-circuit of the second voltage.

The controller switches OFF the first switch when the first timer detects that the excess current detector continuously detects excess current for a predetermined time. Whereby, it is possible to protect the voltage output circuit from the excess current flowing in from the input terminal.

The controller latches the first switch onto the OFF state when the second timer detects elapse of a predetermined time after the first voltage output short-circuit detector detects the first voltage output short-circuit. Whereby, it is possible to prevent the voltage output circuit from breaking in case of a failure due to output short-circuit of the first voltage.

BRIEF DESCRIPTION OF DRAWINGS

FIG. 4 is a diagram for illustrating changes in positive voltage output and negative voltage output when a capacity value of a capacitor in a boost charge pump circuit and a capacity value of a capacitor in a negative voltage charge pump circuit in the positive/negative voltage output circuit are the same according to the first embodiment of this invention;

FIG. 5 is a diagram for illustrating changes in positive voltage output and negative voltage output when a load current on the positive voltage's side is larger than a load current on the negative voltage's side in the positive/negative voltage output circuit according to the first embodiment of this invention;

FIG. 7 is a diagram for illustrating changes in positive voltage output and negative voltage output when a load current on the positive voltage's side and a load current on the negative voltage's side are the same in the positive/negative voltage output circuit according to the first embodiment of this invention;

FIG. 8 is a diagram for illustrating changes in positive voltage output and negative voltage output when a load current on the positive voltage's side and a load current on the negative voltage's side are the same in the positive/negative voltage output circuit according to the second embodiment of this invention;

FIG. 10 is a timing chart for illustrating a procedure of operations of a boost positive voltage output circuit and a negative voltage output circuit in the positive/negative voltage output circuit according to the second embodiment of this invention;

FIG. 11 is a timing chart for illustrating a procedure of operations of a boost positive voltage output circuit and a negative voltage output circuit in the positive/negative voltage output circuit according to the third embodiment of this invention;

Figure 1:
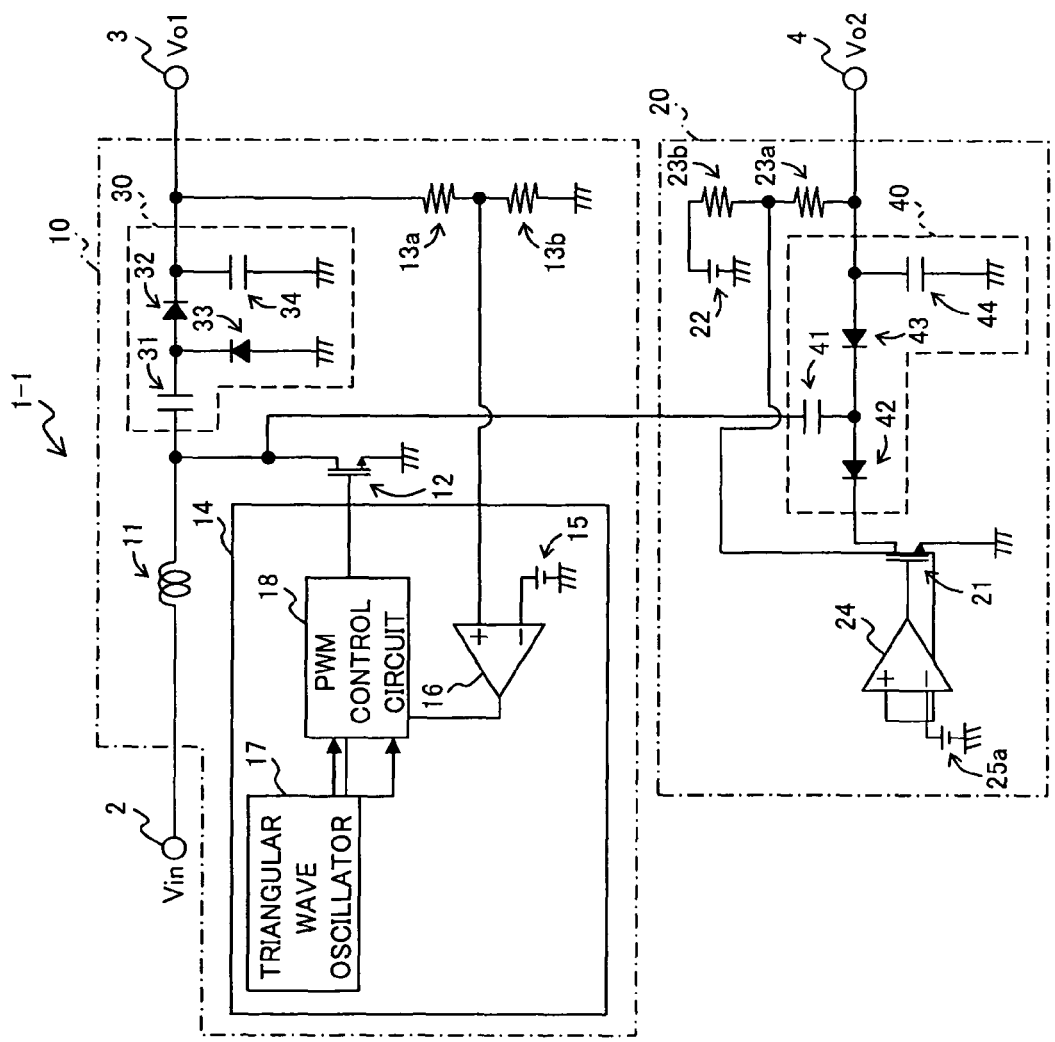
FIG. 1 is a diagram for illustrating a positive/negative voltage output circuit according to a first embodiment of this invention.

EXPLANATION OF NUMERALS 1-1-1-6 . . . positive/negative voltage output circuit (voltage output circuit)
2 . . . input terminal
3 . . . positive voltage output terminal (first voltage output terminal)
4 . . . negative voltage output terminal (second voltage output terminal
10, 100-1 . . . booster positive voltage output circuit
11, 116, 126 . . . coil
12 . . . first switch
13a, 13b, 23a-23d, 119a, 119b, 129a, 129b . . . resistor for output voltage feedback
14 . . . switching controller (controller)
14a . . . VREF terminal
14b . . . DT terminal
14c . . . SCP terminal
15, 22, 25a, 25b, 62, 111, 121 . . . reference voltage
16, 112, 122 . . . error amplifier
17, 113, 123 . . . triangular wave oscillator
18, 114, 124 . . . PWM control circuit
18a . . . comparator
18b . . . amplifier circuit
19, 65, 72, 84 . . . switch
20, 100-2 . . . negative voltage output circuit
21 . . . second switch
24 . . . comparator for constant voltage control (switching unit)
26, 63, 70, 75 . . . capacitor
30 . . . boost charge pump circuit (first charge pump circuit)
31 . . . capacitor (first capacitor)
32, 33, 42, 43, 66 . . . diode
34, 44, 118, 128 . . . capacitor for smoothing
40 . . . negative voltage charge pump circuit (second charge pump circuit)
41 . . . capacitor (second capacitor)
50 . . . output short-circuit detection circuit (first voltage output short-circuit detection circuit)
51 . . . timer latch circuit (second timer)

52, 81 . . . OR circuit
60 . . . voltage abnormality detection circuit (second voltage abnormality detector)
61 . . . timer (first timer)
64a-64c, 65, 67, 71a, 71b, 73, 74, 82, 83, 85 . . . resistor
80 . . . excess current detection circuit (excess current detector)
90 . . . integrated circuit
91 . . . electronic device
100 . . . positive/negative voltage output circuit
102 . . . positive voltage output terminal
103 . . . negative voltage output terminal
110 . . . boost switching controller
115, 125 . . . switching element
117, 127 . . . diode for rectification
118, 128 . . . capacitor for smoothing
120 . . . negative voltage switching controller

BEST MODE FOR CARRYING OUT THE INVENTION

Hereinafter, embodiments of the present invention will be described with reference to the accompanying drawings.

[1] First Embodiment

Now, description will be made of configuration of a positive/negative voltage output circuit (voltage output circuit) 1-1 according to a first embodiment of this invention with reference to FIG. 1. As shown in FIG. 1, the positive/negative voltage output circuit 1-1 comprises a boost positive voltage output circuit 10 which boosts an input voltage (denoted as "Vin" in the drawing) inputted from an input terminal 2 and outputs a desired positive voltage (first voltage; denoted as "Vo1" in the drawing) from a positive voltage output terminal 3; and a negative voltage output circuit 20 which drops the input voltage and outputs a desired negative voltage (second voltage; denoted as "Vo2" in the drawing) from a negative voltage output terminal 4.

The boost positive voltage output circuit 10 comprises a coil 11 which is disposed between the input terminal 2 and two output terminals which are the positive voltage output terminal 3 and the negative voltage output terminal 4; a boost charge pump circuit (first charge pump circuit) 30 which is disposed between the coil 11 and the positive voltage output terminal 3, and boosts the input voltage and outputs the input voltage as a positive voltage; a first switch (switching element) 12 which is disposed between a connection point connecting the coil 11 to the boost charge pump circuit 30 and a ground (ground potential; GND), and switches ON/OFF the boosting by the boost charge pump circuit 30; two resistors 13a and 13b for positive voltage feedback (hereinafter, simply referred to as resistors) which are disposed between a connection point connecting the boost charge pump circuit 30 to the positive voltage output terminal 3 and a ground; and a switching controller (controller; hereinafter simply referred as controller) 14 which controls the switching between ON and OFF of the first switch 12 on the basis of a resistance division value (that is, a resistance division value at a connection point between the resistor 13a and the resistor 13b) of the positive voltage output by the resistors 13a and 13b in order to turn a positive voltage (referred to as a positive voltage output) to be outputted from the positive voltage output terminal 3 into a desired value.

The controller 14 comprises an error amplifier 16 which detects an error between the resistance division value by the resistors 13a and 13b, and a reference voltage 15; a triangular wave oscillator 17 which generates a triangular wave; and a PWM (Pulse Width Modulation) control circuit 18 which controls switching between ON and OFF of the first switch 12 on the basis of the triangular wave generated by the triangular wave oscillator 17 and an error signal from the error amplifier 16.

Meanwhile, the resistors 13a and 13b, and the reference voltage 15 are beforehand set so that the resistance division value by the resistors 13a and 13b and the reference voltage 15 agree with each other when the positive voltage of a desired value is outputted from the positive voltage output terminal 3.

Accordingly, the PWM control circuit 18 controls an ON time (ONDuty) of the first switch 12 on the basis of the error signal from the error amplifier 16 so that the resistance division value by the resistors 13a and 13b agrees with the reference voltage 15, whereby the boost charger pump circuit 30 can boost the input voltage to a preset desired positive voltage and output the boosted positive voltage from the positive voltage output terminal 3.

The boost charge pump circuit 30 comprises a capacitor (first capacitor) 31 and a diode 32 disposed in series between the coil 11 and the positive voltage output terminal 3, arranged in order in the direction from the coil 11 toward the positive voltage output terminal 3; a diode 33 disposed between a connection point connecting the capacitor 31 to the diode 32 for rectification (hereinafter, simply referred to as diode) and a ground; and a capacitor for smoothing (hereinafter, simply referred to as capacitor) 34 disposed between a connection point connecting the diode 32 to the positive voltage output terminal 3 and a ground.

Figure 2:
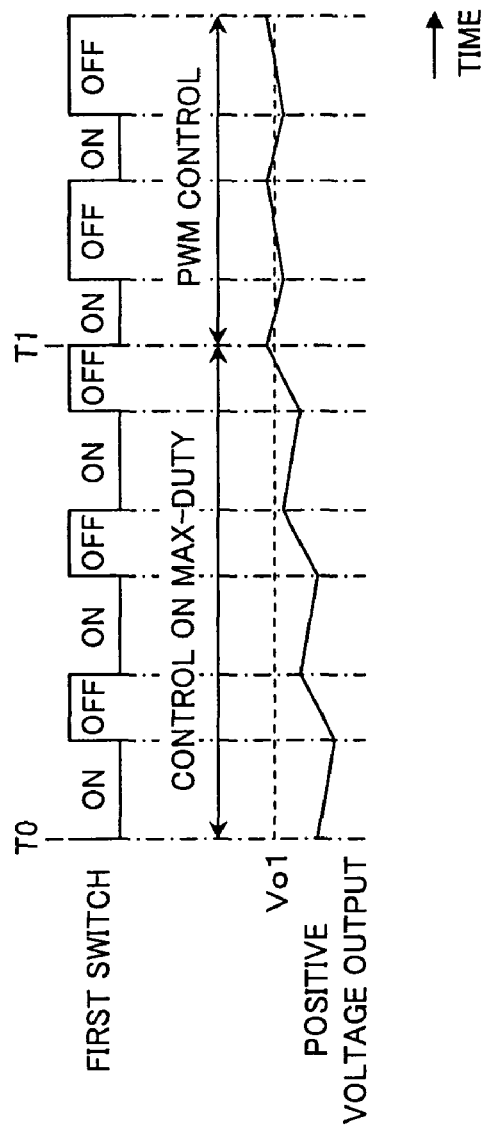
FIG. 2 is a timing chart for illustrating a procedure of operation of a boost positive voltage output circuit of the positive/negative voltage output circuit according to the first embodiment of this invention.

Now, a procedure of operation of the boost positive voltage output circuit 10 will be described in more detail with reference to a timing chart shown in FIG. 2. At the time of a start of the positive/negative voltage output circuit 1-1 (see timing T0), the PWM control circuit 18 of the controller 14 performs the ON/OFF switching control on the first switch 12 in predetermined cycles based on Max-Duty set beforehand because the positive voltage output is lower than a specified value (target value) Vo1.

When the PWM control circuit 18 of the controller 14 controls the first switch 12 to set the same to ON, the coil 11 of the boost charge pump circuit 30 is energized to be driven, the diode 33 is thereby energized to store (charge) electric charge in the capacitor 31. On this occasion, since the rectifier diode 32 is reversely biased, the voltage at the specified value Vo1 is kept by the capacitor 34. However, the capacitor 34 is discharged by a load current at Vo1, hence the positive voltage output is lowered.

When the first switch 12 is then switched OFF under control of the PWM control circuit 18 of the controller 14, a voltage at a connection point (that is, switch node) between the coil 11 and the first switch 12 is raised to a voltage higher than the input voltage (Vin) owing to a counter electromotive force of the coil 11, the input voltage is boosted by the capacitor 31 and the diode 32, whereby the positive voltage output is raised to a value higher than the input voltage. In other words, the boost charge pump circuit 30 boosts the input voltage with the use of an electric power stored in the capacitor 31.

When the positive voltage output is raised to the predetermined value Vo1 by repetition of ON/OFF switching of the first switch 12 (see timings T0 to T1), the PWM control circuit 18 of the controller 14 shifts from the operation based on Max-Duty to a PWM control (see timing T1), whereby the positive voltage output is constantly kept at the specified value Vo1 under the control.

As shown in FIG. 1, the negative voltage output circuit 20 comprises a negative voltage charge pump circuit 40 which is disposed between a connection point connecting the coil 11 in the boost positive voltage output circuit 10 to the first switch 12 and the negative voltage output terminal 4, drops the input voltage according to ON/OFF of the first switch 12 with the use of an electric power (electric charge) stored in a capacitor (second capacitor) 41, and outputs the dropped input voltage as a negative voltage; a second switch 21 which is disposed between the negative voltage charge pump circuit 40 and a ground, and selects whether or not to store the electric power to be used for voltage drop in the negative voltage charge pump circuit 40; two resistors 23a and 23b for negative voltage output feedback (hereinafter, simply referred to as resistors) which are disposed in series between a connection point connecting the negative voltage charge pump circuit 40 to the negative voltage output terminal 4 and the reference voltage 22; and a comparator for constant-voltage control (switching unit; hereinafter, simply referred to as comparator) 24 which switches ON/OFF the second switch 21 on the basis of a negative voltage (hereinafter referred to as negative voltage output) outputted from the negative voltage output terminal 4.

In concrete, the comparator 24 compares a resistance division value (that is, a resistance division value at a connection point between the resistors 23a and 23b) of a negative voltage output and the reference voltage 22 yielded by the resistors 23a and 23b with a reference voltage 25a, and switches ON the second switch 21 when the resistance division value is the reference voltage 25a or more, while switching OFF the second switch 21 when the resistance division value is smaller than the reference voltage 25a.

Namely, the resistors 23a and 23b and the reference voltages 22 and 25a are set beforehand so that the resistance division value by the resistors 23a and 23b agrees with the reference voltage 25a when the negative voltage V02 of a desired value is outputted from the negative voltage output terminal 4.

Accordingly, the comparator 24 switches the second switch 21 according to a result of comparison of the resistance division value by the resistors 13a and 13b with the reference voltage 15 as stated above, whereby the negative voltage charge pump circuit 40 can drop the input voltage to a desired negative voltage V02 set beforehand, and output the dropped voltage from the negative voltage output terminal 4.

The negative voltage charge pump circuit 40 is connected to a connection point between the coil 11 and the first switch 12; and comprises a capacitor 41 which is connected to the connection point between the coil 11 and the first switch 12; a diode 42 which is disposed between the capacitor 41 and the second switch 21; a diode 43 which is disposed between the capacitor 41 and the resistor 23a; and a capacitor 44 which is disposed between a connection point connecting the resistor 23a to the diode 43, and a ground.

Figure 3:
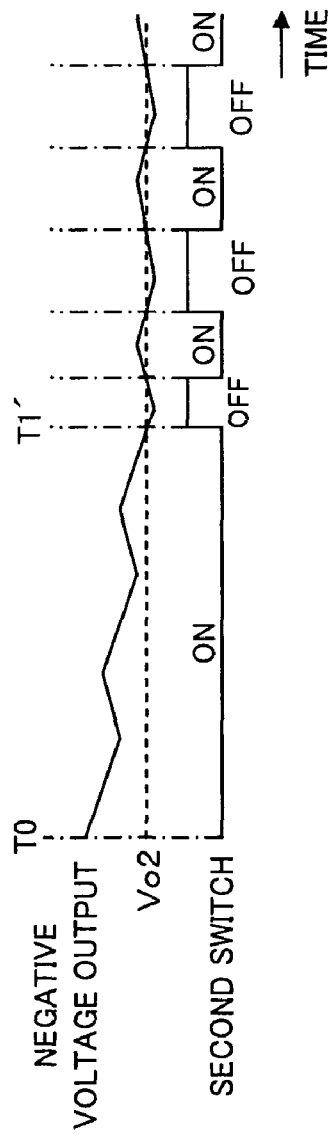
FIG. 3 is a timing chart for illustrating a procedure of operation of a negative voltage output circuit of the positive/negative voltage output circuit according to the first embodiment of this invention.

Now, a procedure of operation of the negative voltage output circuit 20 will be described in more detail with reference to a timing chart shown in FIG. 3. The negative voltage output is higher than the specified value Vo2 at the time of a start (see timing T0) of the positive/negative voltage output circuit 1-1, hence the second switch 21 is set to ON by the comparator 24 until the negative voltage output becomes equal to or less than the specified value Vo2.

On this occasion, the negative voltage output is dropped by the negative voltage charge pump circuit 40 according to ON/OFF of the first switch 12.

Namely, when the second switch 21 is set to ON and the first switch 12 is set to OFF, electric charge is stored (charged) in the capacitor 41 of the negative voltage charge pump circuit 40, and when the first switch 12 is then turned ON, the input voltage is dropped to a negative voltage via the capacitor 41 and the diode 43.

As this, when the first switch is turned ON and OFF, with the second switch 21 being ON, the negative voltage output is gradually dropped and lowered. In other words, the negative voltage charge pump circuit 40 drops the input voltage with the use of an electric power stored in the capacitor 41.

When the negative voltage output is lowered to the specified value Vo2 (see timing T1'), the comparator 24 is reversed to turn OFF the second switch 21, the negative voltage charge pump circuit 40 is stopped as a result. Thereafter, the negative voltage output is controlled to be constant at the specified value Vo2 according to ON/OFF of the first switch 12 and the second switch 21.

Namely, since the electric charge is not stored in the capacitor 41 when the second switch 21 is OFF, the negative voltage output is not much dropped (lowered) by the negative voltage charge pump circuit 40 even when the first switch 12 is ON. The first switch 12 is PWM-controlled by the PWM control circuit 18 of the controller 14 while the comparator 24 turns ON and OFF the first switch 12 according to the negative voltage output, whereby the negative voltage output can be kept constant.

In the meantime, the current capability of the boost charge pump circuit 30 and the negative voltage charge pump 40 relate to capacity values of the capacitors 31 and 41 for pump-up, respectively. Accordingly, the larger the capacity value, the larger is the current capability, and also, the larger is the voltage value to be boosted or dropped.

Therefore, when the capacity values of the capacitors 31 and 41 are the same, the PWM control circuit 18 controls ON/OFF of the first switch 12 so that the positive voltage output is kept constant. In the case where the specified values (set voltages) of both positive and negative outputs are the same (for example, the specified value Vo1 of the positive voltage is +15V, while the specified value Vo2 of the negative voltage is −15V), when the load current on the negative voltage's side (that is, on the side of the negative voltage output circuit 20) becomes larger than the load current on the positive voltage's side (that is, on the side of the boost positive voltage output circuit 10), there arises a problem that the negative voltage output on the negative voltage's side cannot be lowered to the set voltage (−15V), as shown in FIG. 4.

For this, the capacity value of the capacitor 41 in the negative voltage charge pump circuit 40 is set to be larger than the capacity value of the capacitor 31 in the boost charge pump circuit 30 in the positive/negative voltage output circuit 1-1. Whereby, even when the load current on the positive voltage's side becomes larger than the load current on the negative voltage's side, with the specified values of both the positive and negative outputs being the same, movement of the electric charge by one switching is larger on the negative voltage's side, which increases the current driving capability. This makes it possible to drop the negative voltage output to the set voltage (−15V) with certainty, as shown in FIG. 5.

In the case where the specified values Vo1 and Vo2 of the positive and negative outputs differ from each other and a difference between the specified value Vo2 of the negative voltage and 0V is larger than a difference between the specified value Vo1 and 0V (for example, the specified value Vo1 of the positive voltage is +15V, whereas the specified value Vo2 of the negative voltage is −20V), there arises a problem that the negative voltage output cannot reach the specified value Vo2 when the capacity values of the capacitors 31 and 41 are the same. This problem can be overcome by setting the capacity value of the capacitor 41 to a value larger than the capacity value of the capacitor 31.

In the positive/negative voltage output circuit 1-1 according to the first embodiment of this invention, the boost positive voltage output circuit 10 comprises the coil 11; the boost charge pump circuit 30 which is disposed between the coil 11 and the positive voltage output terminal 3, transforms the voltage of the input voltage, and outputs the boosted voltage as a positive voltage; the first switch 12 which is disposed between a connection point connecting the coil 11 to the boost charge pump circuit 30 and the ground, and switches ON/OFF the transformation by the boost charge pump circuit 30; and the controller 14 which controls the switching between ON and OFF of the first switch 12 in order to control the positive voltage outputted from the positive voltage output terminal 3 to a desired value Vo1; whereas the negative voltage output circuit 20 comprises the negative voltage charge pump circuit 40 which is disposed between a connection point connecting the coil 11 to the first switch 12 and the negative voltage output terminal 4, transforms the voltage with the use of an electric power stored according to ON/OFF of the first switch 12, and outputs the transformed voltage as a negative voltage; the second switch 21 which is disposed between the negative voltage charge pump circuit 40 and the ground, selects to whether or not to store the electric power to be used for transformation of in the negative charge pump circuit 40; and the comparator 24 which switches ON/OFF the second switch 21 on the basis of a negative voltage outputted from the negative voltage output terminal. Accordingly, it is possible to transform the input voltage and output desired positive and negative voltages with a quite simple configuration, and to attain a reduction in cost and size of the positive/negative voltage output circuit 1-1.

In other words, since the negative voltage output circuit 20 is configured with the negative voltage charge pump circuit 40 which is operated with the use of switching of the boost positive voltage output circuit 10 and the comparator 24 for control on low voltage of negative voltage, it is possible to stably output the positive voltage at a desired value Vo1 and the negative voltage at a desired value Vo2 irrespective of the load current, etc., with a quite simple configuration with one coil 11 and one controller 14 performing only the PWM control. In addition, the contents of the control by the controller 14 and the configuration of the controller 14 are not complicated, unlike the known technique disclosed in patent document 1 aforementioned.

As above, the positive/negative voltage output circuit 1-1 configured with the controller 14 which is simply configured to perform only the PWM control and one coil 11 can largely contribute to a reduction in cost and size.

[2] Second Embodiment

Figure 6:
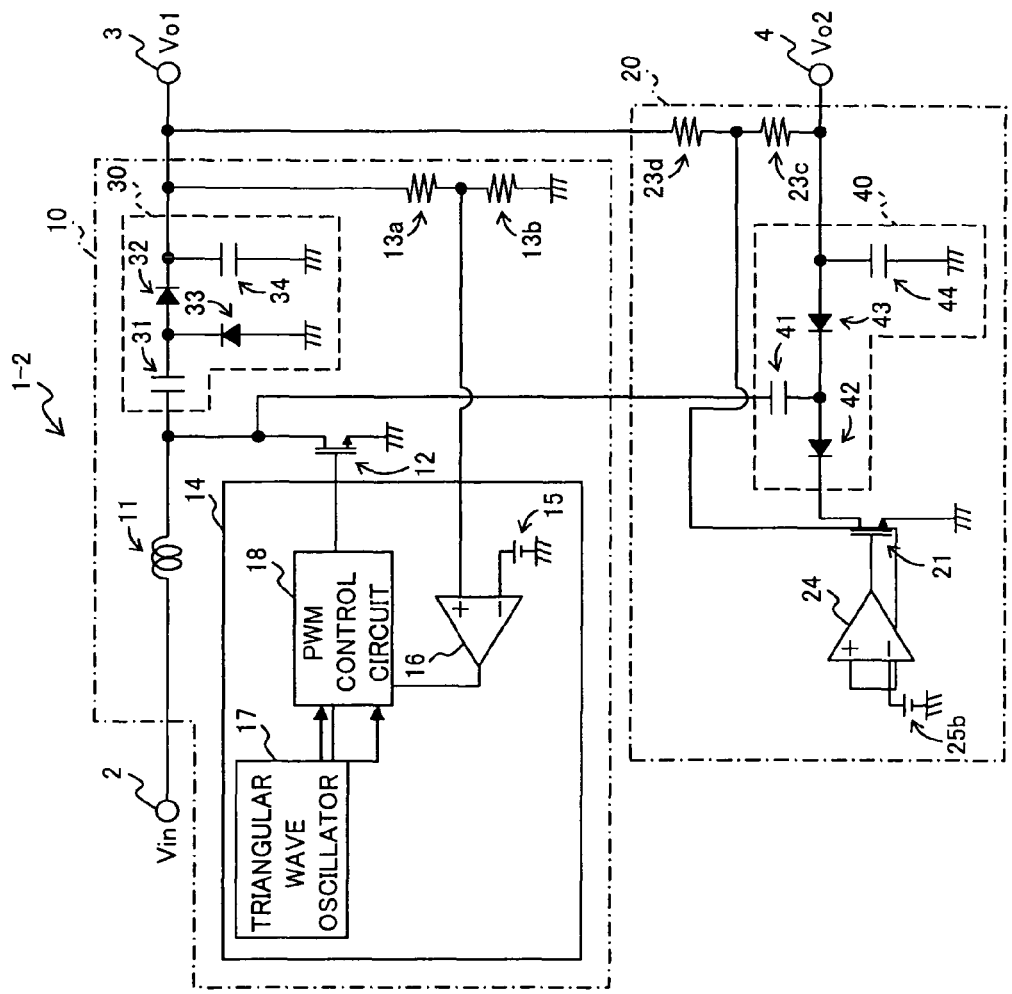
FIG. 6 is a diagram for illustrating configuration of a positive/negative voltage output circuit according to a second embodiment of this invention.

Next, description will be made of configuration of a positive/negative voltage output circuit 1-2 according to a second embodiment of this invention. As shown in FIG. 6, the positive/negative voltage output circuit 1-2 is configured similarly to the above-described positive/negative voltage output circuit 1-1 according to the first embodiment, except that the comparator 24 in the negative voltage output circuit 20 switches ON/OFF the second switch 21 according to a reference voltage 25b (0V) and a resistance division value of a positive voltage output and a negative voltage output yielded by resistors 23c and 23d for negative voltage output feedback. Incidentally, like reference characters in FIG. 6 designate like or corresponding parts described hereinbefore, detailed descriptions of which are thus omitted.

The comparator 24 of the negative voltage output circuit 20 in the positive/negative voltage output circuit 1-2 switches ON/OFF the second switch 21 on the basis of a resistance division value (that is, a resistance division value of the positive voltage output and the negative voltage output) at a connection point between the two resistors 23c and 23d disposed in series between the positive voltage output terminal 3 and the negative voltage output terminal 4 (here, between a connection point connecting the positive voltage output terminal 3 to the boost charge pump circuit 30 and a connection point connecting the negative voltage output terminal 4 to the negative voltage charge pump circuit 40). As a result, the negative voltage output is varied (tracking-controlled) according to the positive voltage output, in the positive/negative voltage output circuit 1-2. Incidentally, values of the resistors 23c and 23d are determined according to a relationship (ratio) between a specified value Vo1 of the positive voltage and a specified value Vo2 of the negative voltage. When the specified values Vo1 and Vo2 are at the same value but their polarity differs from each other, for example, the values of the resistors 23c and 23d are the same.

In the above-described positive/negative voltage output circuit 1-1 according to the first embodiment, the capacity value of the capacitor 41 larger than the capacity value of the capacitor 31 causes larger movement of the electric charge by one switching, hence the voltage of the negative voltage output is more varied than that of the positive voltage output. For this reason, when values of the specified value Vo1 of the positive voltage and a value of the specified value Vo2 of the negative voltage V02 are the same (here, the specified value of the positive voltage is +15V, whereas the specified value of the negative voltage is −15V) as shown in FIG. 7, the negative voltage output reaches the specified value Vo2 earlier, which generates a difference between a timing (Tb) at which the positive voltage reaches the specified value Vo1 and a timing (Ta) at which the negative voltage reaches the specified value Vo2.

To the contrary, in the positive/negative voltage output circuit 1-2, the negative voltage output is varied according to the positive voltage output, hence the timing at which the positive voltage reaches the specified value Vo1 and the timing at which the negative voltage reaches the specified value Vo2 become the same (here, Tb), as shown in FIG. 8.

The positive/negative voltage output circuit 1-2 according to the second embodiment of this invention can provide the same working effects as the above-mentioned first embodiment. In addition, since the comparator 24 switches ON/OFF the second switch 21 on the basis of a resistance division value of the positive voltage output and the negative voltage output yielded by the resistors 23c and 23d, the positive/negative voltage output circuit 1-2 allows the positive voltage output and the negative voltage output to simultaneously reach the specified values Vo1 and Vo2, respectively, even when the capacity value of the capacitor 41 is larger than that of the capacitor 31. Accordingly, the positive/negative voltage output circuit 1-2 can cope with a case where the specifications of an apparatus that is supplied the power source from the positive/negative voltage output circuit 1-2 require simultaneous supply of the positive voltage and the negative voltage.

[3] Third Embodiment

Figure 9:
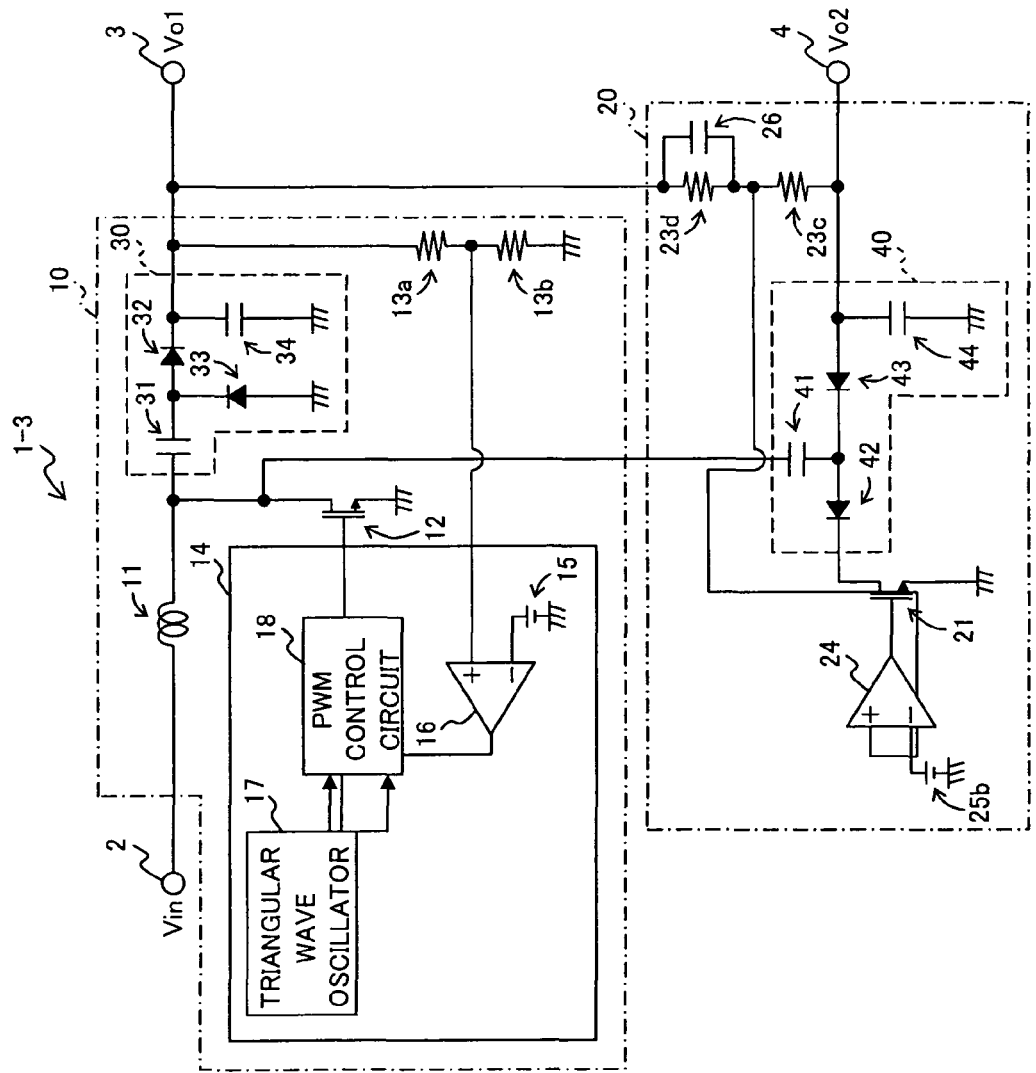
FIG. 9 is a diagram for illustrating configuration of a positive/negative voltage output circuit according to a third embodiment of this invention.

Next, description will be made of configuration of a positive/negative voltage output circuit 1-3 according to a third embodiment of this invention with reference to FIG. 9. As shown in FIG. 9, the positive/negative voltage output circuit 1-3 is configured similarly to the positive/negative voltage output circuit 1-2 according to the above-described second embodiment, except that a capacitor 26 is disposed in parallel to the resistor 23d. Incidentally, like reference characters in FIG. 9 designate like or corresponding parts described hereinbefore, detailed descriptions of which are thus omitted.

The negative voltage output circuit 20 in the positive/negative voltage output circuit 1-3 has a capacitor 26 in parallel to the resistor 23d disposed on the side of the positive voltage output terminal 4, which is one of the two resistors 23c and 23d resistance-dividing the positive voltage output and the negative voltage output to be inputted to the comparator 24.

The capacitor 26 instantaneously generates the same state as the resistor 23d short-circuits, according to a variation (ripple) in the positive voltage output, to change the resistance division value to be inputted to the comparator 24, thereby interlocking the ON/OFF control on the second switch 21 by the comparator 24 with the first switch 12.

Now, operation of the aforementioned positive/negative voltage output circuit 1-2 (without the capacitor 26) according to the second embodiment will be explained with reference to FIG. 10. When the second switch 21 is OFF, the first switch 12 is OFF. Hence, the electric charge is not stored in the capacitor 41 even when the voltage at the switch node arises. The counter electromotive force of the coil 11 is thereby all supplied to the positive voltage output through the capacitor 31, which causes a rapid rise in the positive voltage output (see (1) and (1)' in the drawing).

For this, even when the first switch 12 is then turned ON, it takes considerable time for the positive voltage output to drop, hence the voltage at the connection point between the resistors 23c and 23d does not drop to below a reference voltage (detection voltage; here, 0V) of the comparator 24. Accordingly, the second switch 21 is kept ON (see (2) and (2)' in the drawing).

Further, when the first switch 12 is turned OFF, the electric charge supplied to the positive voltage output through the capacitor 31 is decreased because the second switch 12 is kept ON, hence the positive voltage output is not much increased (see (3) and (3)' in the drawing).

Thereafter, when the first switch 12 is turned ON, the negative voltage output is further decreased, and the voltage at the connection point between the resistors 23c and 23d is decreased to the reference voltage of the comparator 24 or less. The comparator 24 is thereby reversed to set the second switch 21 to OFF (see (4) and (4)' in the drawing). A timing at which the second switch 21 is turned from ON to OFF lags a little behind a timing at which the first switch 12 is turned from ON to OFF.

As stated above, in the aforementioned positive/negative voltage output circuit 1-2 according to the second embodiment, a cycle in which the second switch 21 is turned ON/OFF by the comparator 24 is about two through four times (two times in the example shown in FIG. 10) longer than a cycle in which the first switch 12 is turned ON/OFF by the controller 14, which increases output ripple (ripple amplitude) R of the positive voltage output (see (1) and (1)' in the drawing).

To the contrary, in the positive/negative voltage output circuit 1-3 with the capacitor 26, the resistor 23d becomes the same state as short-circuited only in a moment the first switch 12 is turned from ON to OFF or OFF to ON (that is, only in a moment the positive voltage output is turned to rise or drop), as a result, a voltage (resistance division value) at the connection point between the resistors 23c and 23d is sharply changed. In other words, the resistance division value to be inputted to the comparator 24 is changed larger than usual, hence the second switch 21 is turned OFF or ON by the comparator 24.

Accordingly, as shown in FIG. 11, ON/OFF of the second switch 21 is switched in synchronization with the first switch 12 according to ON/OFF of the first switch 21, as a result, the output ripple of the positive voltage output can be reduced. The timing at which the second switch 21 is turned from ON to OFF lags a little behind the timing at which the first switch 12 is turned from ON to OFF, and a duration that the second switch 21 is OFF is shorter than a case where the positive/negative voltage output circuit 1-3 does not have the capacitor 26 shown in FIG. 10.

As above, the positive/negative voltage output circuit 1-3 according to the third embodiment of this invention can provide the same working effects as the aforementioned second embodiment. In addition, the comparator 26 disposed in parallel to the resistor 23d can forcibly change the input to the comparator 24 when the first switch 21 is turned from ON to OFF to switch OFF the second switch 21 in synchronization with OFF of the first switch 12, thereby synchronizing ON/OFF of the second switch 21 with ON/OFF of the first switch 12, which is efficient to reduce the output ripple of the positive voltage output.

[4] Fourth Embodiment

Figure 12:
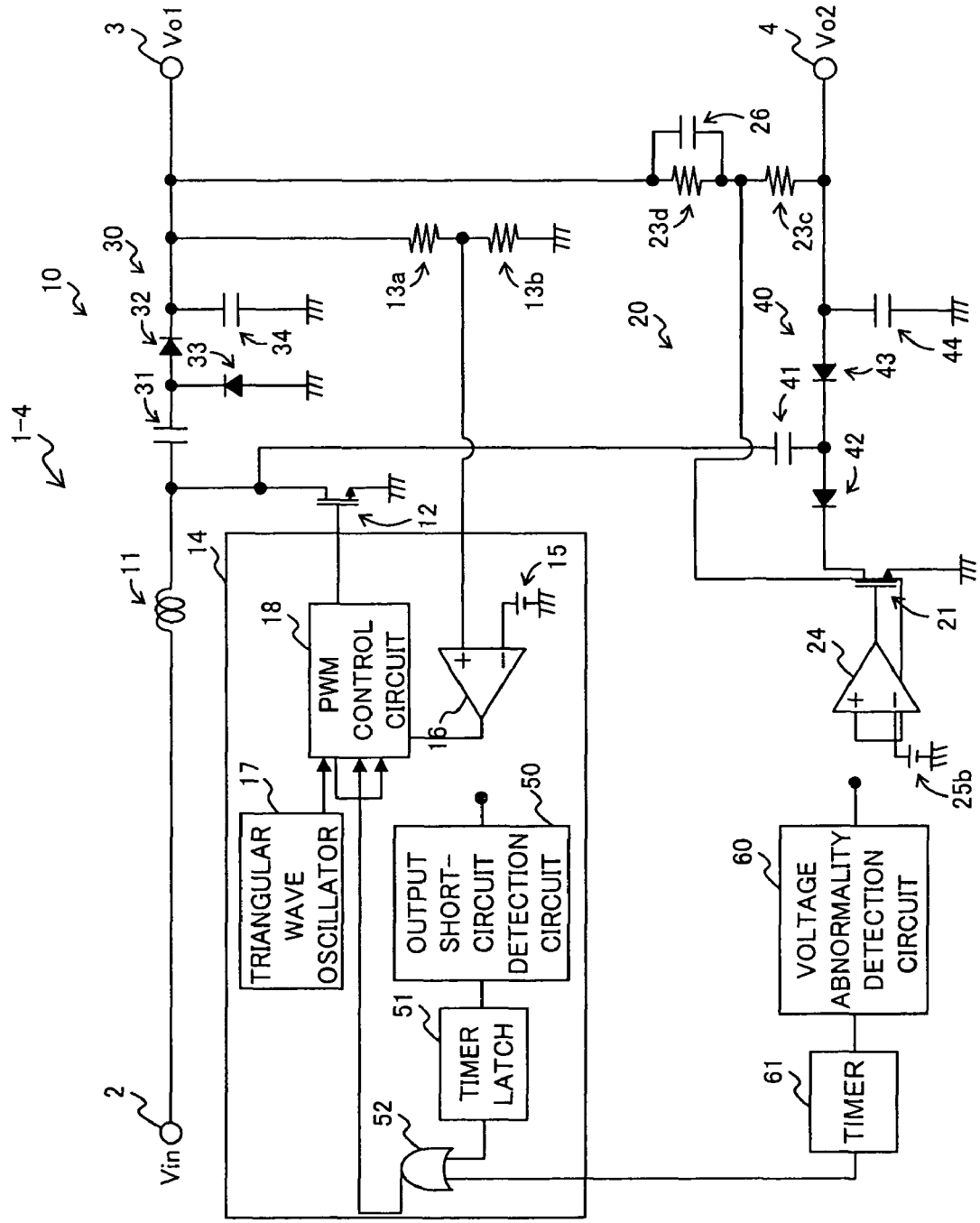
FIG. 12 is a diagram for illustrating configuration of a positive/negative voltage output circuit according to a fourth embodiment of this invention.

Next, description will be made of configuration of a positive/negative voltage output circuit 1-4 according to a fourth embodiment of this invention with reference to FIG. 12. As shown in FIG. 12, the positive/negative voltage output circuit 1-4 is configured similarly to the above-described positive/negative voltage output circuit 1-3 according to the third embodiment, except that the controller 14 in the boost positive voltage output circuit 10 has an output shirt-circuit detection circuit (first voltage output short-circuit detector) 50, a timer latch circuit (denoted as "Timer Latch" in the drawing; second timer) 51 and an OR (logical sum) circuit 52, whereas the negative voltage output circuit 20 has a voltage abnormality detection circuit (second voltage abnormality detector) 60 and a timer (first timer) 61. Incidentally, like reference characters in FIG. 12 designate like or corresponding parts described hereinbefore, detailed description of which are thus omitted.

In the positive/negative voltage output circuit 1-4, the output short-circuit detection circuit 50 and the timer latch circuit 51 together accomplish an output short-circuit protection function of a timer latch type that prevents the circuit from breaking in case of an output short-circuit fault of the positive voltage output. In addition, the positive/negative voltage output circuit 1-4 has the voltage abnormality detection circuit 60, the timer 61 and the OR circuit 52 in order to protect the positive/negative voltage output circuit 1-4 from output short-circuit of the negative voltage output.

Figure 13:
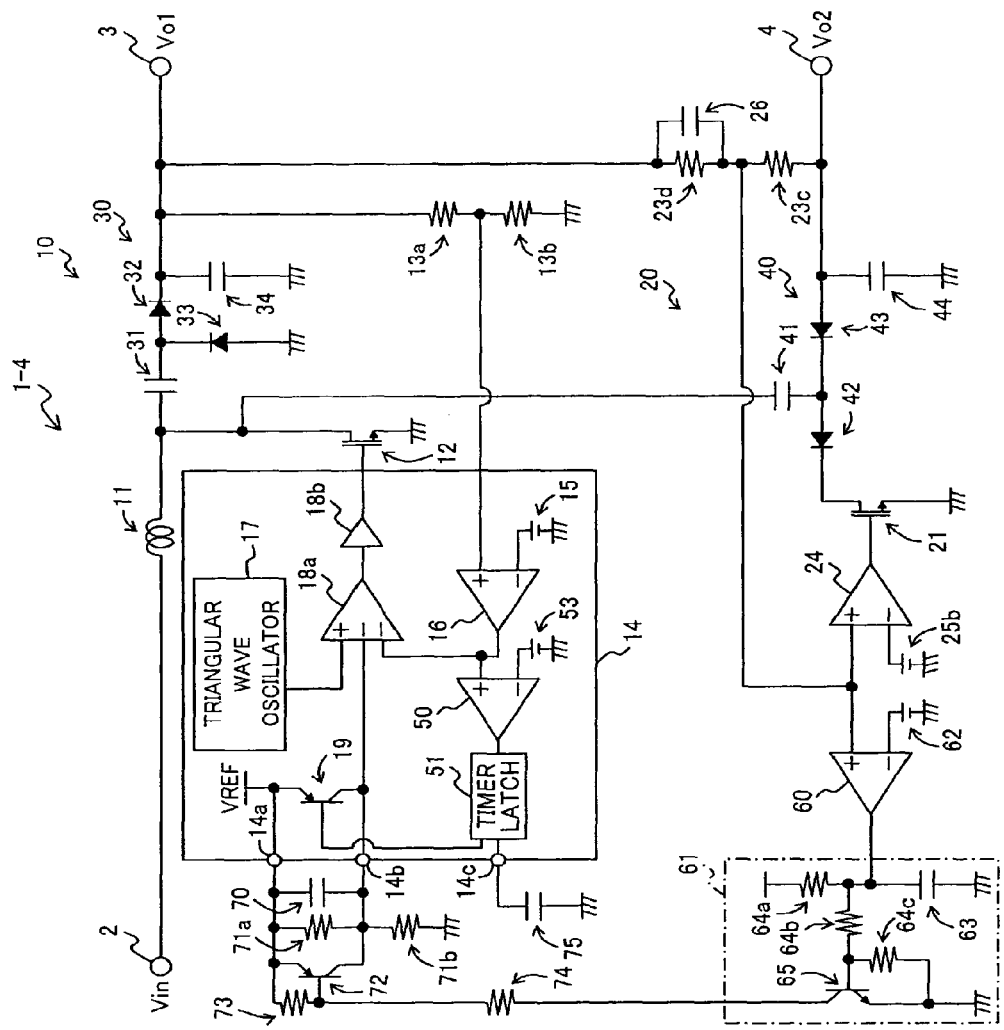
FIG. 13 is a diagram for illustrating circuit configuration of the positive/negative voltage output circuit according to the fourth embodiment of this invention.

FIG. 13 shows a detailed circuit configuration of the positive/negative voltage output circuit 1-4. In FIG. 13, parts corresponding to the function blocks shown in FIG. 12 are denoted by the same reference characters. Now, the configuration of the positive/negative voltage output circuit 1-4 will be described with reference to FIGS. 12 and 13.

The output short-circuit detection circuit 50 detects positive voltage output short-circuit on the basis of the positive voltage output outputted from the positive voltage output terminal 3. In concrete, the output short-circuit detection circuit 50 is configured with a comparator to detect output short-circuit on the basis of an error signal EAo from the error amplifier 16 and a reference voltage 53.

The output short-circuit detection circuit 50 is reversed when output short-circuit occurs and the error signal EAo from the error amplifier 16 becomes the reference voltage 53 or less, and outputs a high-level signal (High signal) to the timer latch circuit 51.

The timer latch circuit 51 detects elapse of a predetermined time period when the output short-circuit of the positive voltage is detected by the output short-circuit detection circuit 50.

The OR circuit 52 inputs a logical sum of a signal from the timer latch circuit 51 and a signal from the timer 61 to the PWM control circuit 18.

The PWM control circuit 18 is comprised of a comparator 18a and an amplifier circuit 18b as shown in FIG. 13.

The voltage abnormality detection circuit 60 detects voltage abnormality of the negative voltage on the basis of the negative voltage output outputted from the negative voltage output terminal 4. In concrete, the voltage abnormality detection circuit 60 is comprised of a comparator to detect voltage abnormality of the negative voltage output on the basis of a resistance division value of the positive voltage output and the negative voltage output by the resistors 23c and 23d, and a reference voltage 62.

When the negative voltage output rises due to a GND short-circuit failure and the resistance division value by the resistors 23c and 23d becomes the reference voltage 62 or more, the voltage abnormality detection circuit 60 turns OFF the output to start the timer 61.

The timer 61 detects that the voltage abnormality detection circuit 60 continuously detects voltage abnormality for a predetermined time (that is, a signal of low level is continuously inputted for a predetermined time). In concrete, the timer 61 is comprised of a capacitor 63, resistors 64a to 64c and a switch 65, and charges the capacitor 63 with a predetermined amount of electric charge to detects whether a predetermined time has elapsed or not when the output from the voltage abnormality detection circuit 60 becomes OFF.

The controller 14 has a VREF terminal 14a, a DT terminal 14b and an SCP terminal 14c. In the controller 14, a capacitor 70, a resistor 71a and a switch 72 are connected in parallel between the VREF terminal 14a and the DT terminal 14b, while a resistor 71b is connected to the DT terminal 14b side of the resistor 71a, the other side of the resistor 71b being grounded.

Resistors 73 and 74 are connected in series between the VREF terminal 14a and the switch 65 of the timer 61, and a connection point between the resistors 73 and 74, is connected to the switch 72. Incidentally, the resistors 73 and 74 are to drive the switch 72, interlocked with the switch 65 of the timer circuit 61.

A capacitor 75 is connected to the SCP terminal 14c connected to the timer latch circuit 51, the other side of the capacitor 75 being grounded.

The DT terminal 14 and the comparator 18a are connected, whereby DT (Duty; Max-Duty) set by the resistors 71a and 71b which are division resistors can be inputted to the comparator 18a through the DT terminal.

The VREF terminal 14a is connected to a reference voltage VREF, and the controller 14 has a switch 19 disposed between a connection point connecting the VREF terminal 14a to the reference voltage VREF and a connection point connecting the DT terminal 14b to the comparator 18a.

The switch 19 is connected to the timer latch circuit 51 to be switched ON/OFF according to a signal from the timer latch circuit 51. Incidentally, the switch 72 and the switch 19 mainly accomplish the OR circuit 52.

Figure 14:
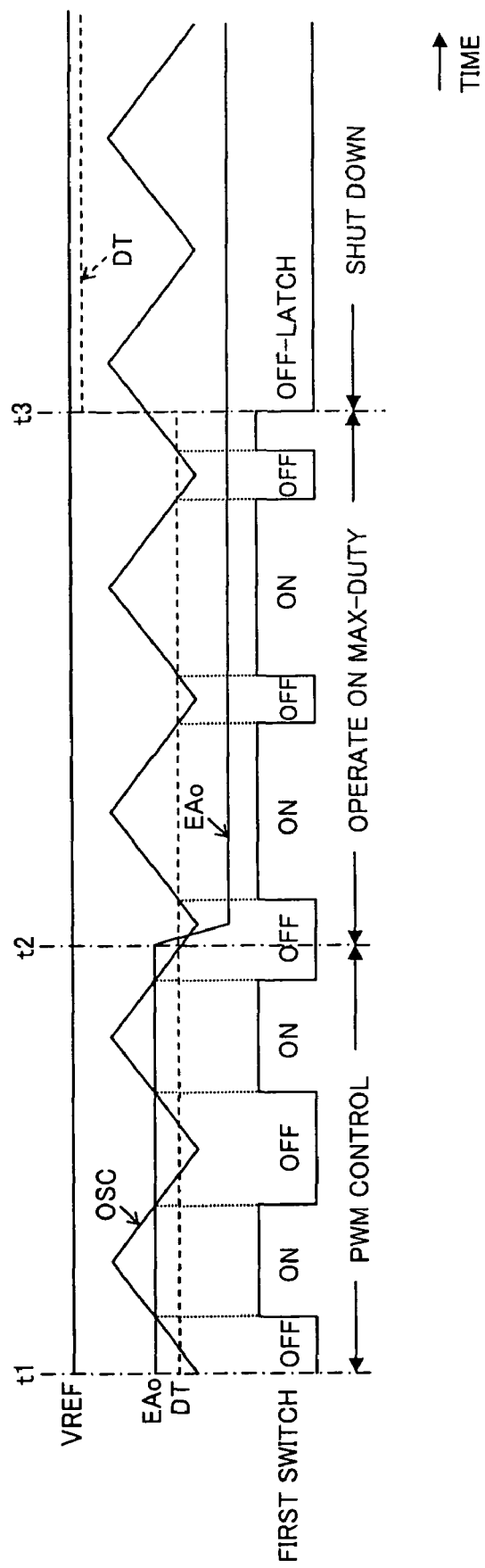
FIG. 14 is a timing chart for illustrating a switching control on a first switch by a controller when an output short-circuit of a positive voltage output from the positive/negative voltage output circuit according to the fourth embodiment of this invention occurs.

Now, a control operation of the controller 14 performed when output short-circuit of the positive voltage output occurs will be explained with reference to FIG. 14.

During the normal operation, the PWM control unit 18 executes the PWM control to control ON/OFF switching of the first switch 12. Namely, the PWM control unit 18 executes the ON/OFF switching of the first switch 12 on the basis of a triangular wave (denoted as "OSC" in the drawing) generated by the triangular wave oscillator 17 and an error signal EAo from the error amplifier 16 at a timing that the triangular wave crosses the error signal EAo (see timing t1 to t2).

When the normal voltage output drops due to short-circuit and the error signal (output) EAo from the error amplifier 26 is thereby lowered to the reference voltage 53 or less (see timing t2), the comparator 50 acting as the output short-circuit detection circuit 50 is reversed to switch ON the timer latch circuit 51.

While the timer latch circuit 51 is detecting elapse of a predetermined time, the PWM control unit 19 controls switching of the first switch 12 on the basis of Max-Duty set by the dividing resistances 71a and 71b and fed through the DT terminal 14b (see timing t2 to t3).

Thereafter, when the timer latch circuit 51 detects elapse of the predetermined time set beforehand (see timing t3), the timer latch circuit 51 switches ON the switch 19. As a result, the voltage at the DT terminal 14b rises to near the reference voltage VREF, hence DT inputted to the comparator 18a rises. Accordingly, the triangular wave and the DT do not cross, so that the PWM control circuit 18 latches the first switch 12 onto the OFF state (shuts down).

Figure 15:
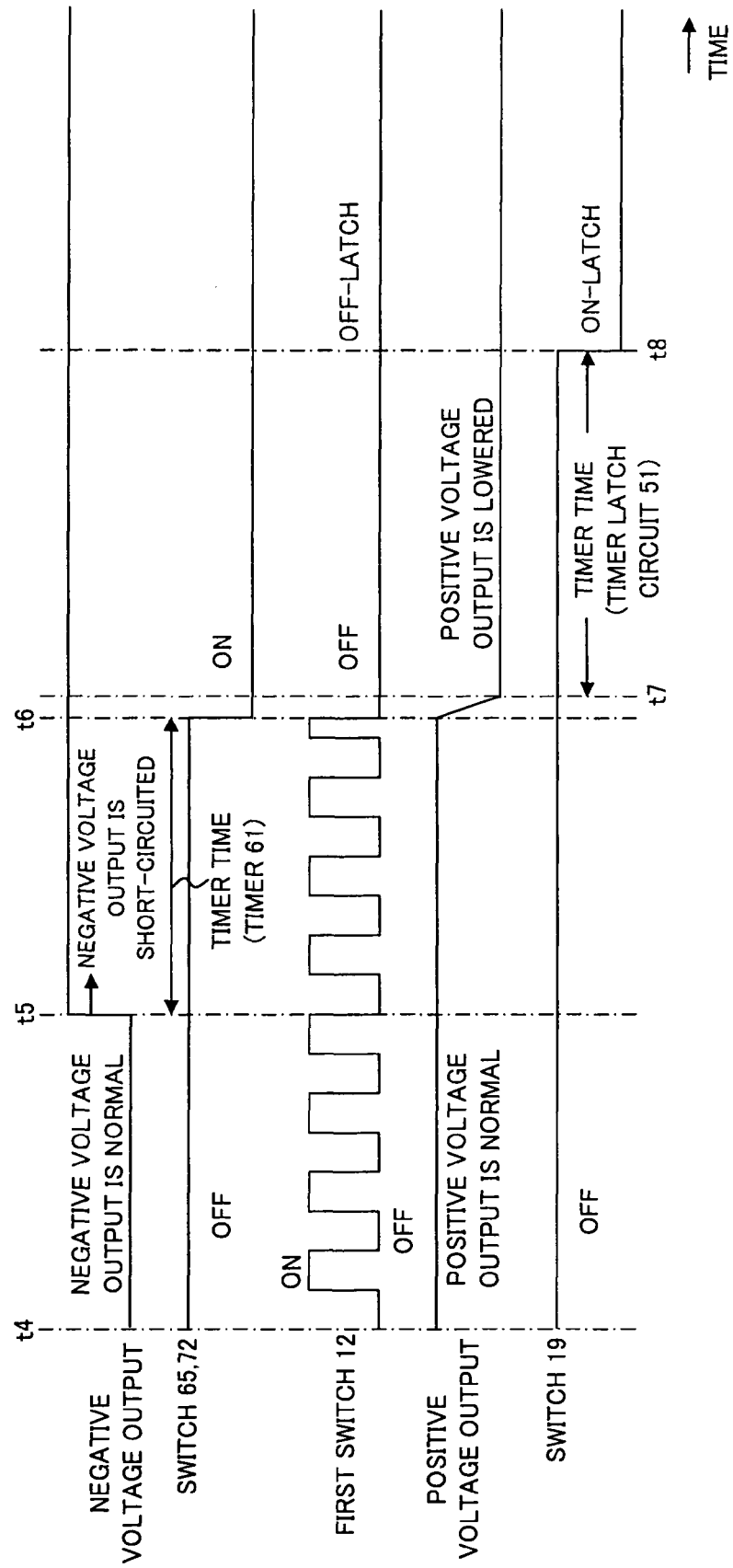
FIG. 15 is a timing chart for illustrating an operation of the positive/negative voltage output circuit according to the fourth embodiment of this invention when an output short-circuit of a negative voltage output from the positive/negative voltage output circuit occurs.

Next, explained is a case where the voltage abnormality voltage output of the negative voltage output occurs due to GND short-circuit, with reference to FIG. 15.

While the negative voltage output is normal (during timing t4 to t5), the switches 65, 72 and 19 remain in the OFF state. When the negative voltage output rises due to a GND short-circuited failure and the resistance division value by the resistors 23c and 23d rises to the reference voltage 62 or higher (see timing t5), the voltage abnormality detection circuit (that is, comparator) 60 switches OFF the output to drive the timer 61.

The timer 61 can detect that the voltage abnormality detection circuit 60 continuously detects the output short-circuit of the negative voltage output for a predetermined time, from a fact that the electric charge of a predetermined amount is charged in the capacitor 63. Namely, when the voltage abnormality detection circuit 60 keeps detecting the output short-circuit of the negative voltage output for a predetermined time until the charging of the capacitor 63 is completed (see timing t5 to t6), the switch 65 of the timer 61 is turned ON, the switch 72 is thereby turned ON, the voltage at the DT terminal 14b rises to near the reference voltage VREF, the DT inputted to the comparator 18a rises, whereby the PWM control circuit 18 switches OFF the first switch 12 (see timing t6).

The positive voltage output decreases since the first switch 12 is kept OFF. When the error signal EAo from the error amplifier 16 becomes the reference voltage 53 or less (see timing t7), the comparator 50 acting as the output short-circuit detection circuit 50 is reversed to turn ON the timer latch circuit 51 to detect elapse of a predetermined time (see timing t7 to t8).

When the timer latch circuit 51 detects elapse of the predetermined time, the timer latch circuit 51 turns ON the switch 19 to completely latch the first switch 12 onto the OFF state.

As stated above, the positive/negative voltage output circuit 1-4 according to the fourth embodiment of this invention can provide the same working effects as the third embodiment described hereinbefore. In addition, even when the positive voltage output is output-short-circuited or even when the negative voltage output is output-short-circuited, the positive/negative voltage output circuit 1-4 can detect the output short-circuit to stop the switching control on the first switch 12 by the controller 14, and latch (shut down) the first switch 12 onto the OFF state. As a result, it is possible to prevent the circuit from breaking in case of an output short-circuit failure of the positive voltage output or the negative voltage output.

[5] Fifth Embodiment

Figure 16:
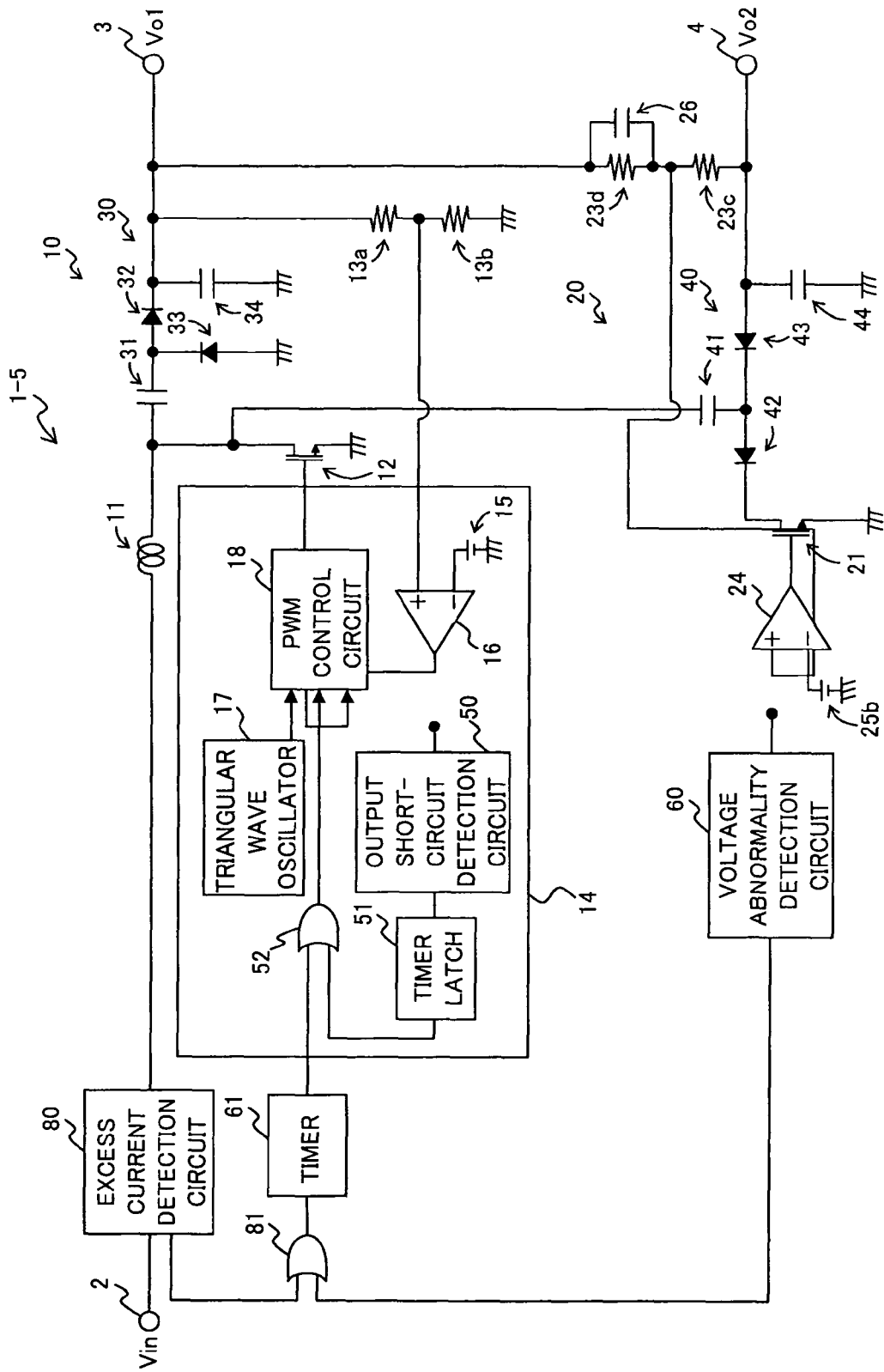
FIG. 16 is a diagram for illustrating configuration of a positive/negative voltage output circuit according to a fifth embodiment of this invention.

Next, description will be made of configuration of a positive/negative voltage output circuit 1-5 according to a fifth embodiment of this invention with reference to FIG. 16. As shown in FIG. 16, the positive/negative voltage output circuit 1-4 is configured similarly to the positive/negative voltage output circuit 1-4 according to the aforementioned fourth embodiment, except that the positive/negative voltage output circuit 1-5 further has an excess current detection circuit (excess current detector) 80 which is disposed between the input terminal 2 and the coil 11 and detects an excess current from the input terminal 2, and an OR circuit 81 which inputs a logical sum of outputs from the voltage abnormality detection circuit 60 and the excess current detection circuit 80 to the OR circuit 52, wherein the timer 61 detects that either the excess current detection circuit 80 or the voltage abnormality detection circuit 60 continuously detects an incident for a predetermined time or more. Incidentally, like reference characters in FIG. 16 designate like or corresponding parts described hereinbefore, detailed descriptions of which are thus omitted.

In the positive/negative voltage output circuit 1-5, when the excess current detection circuit 80 detects that an input current inputted from the input terminal 2 is an excess current and the timer 61 detects that the excess current detection circuit 80 continuously detects the excess current from the input terminal 2 for a predetermined time, the PWM control circuit 18 performs a control to turn OFF the first switch 12, thereby to protect the positive/negative voltage output circuit 1-5 from the excess current of the input current.

Figure 17:
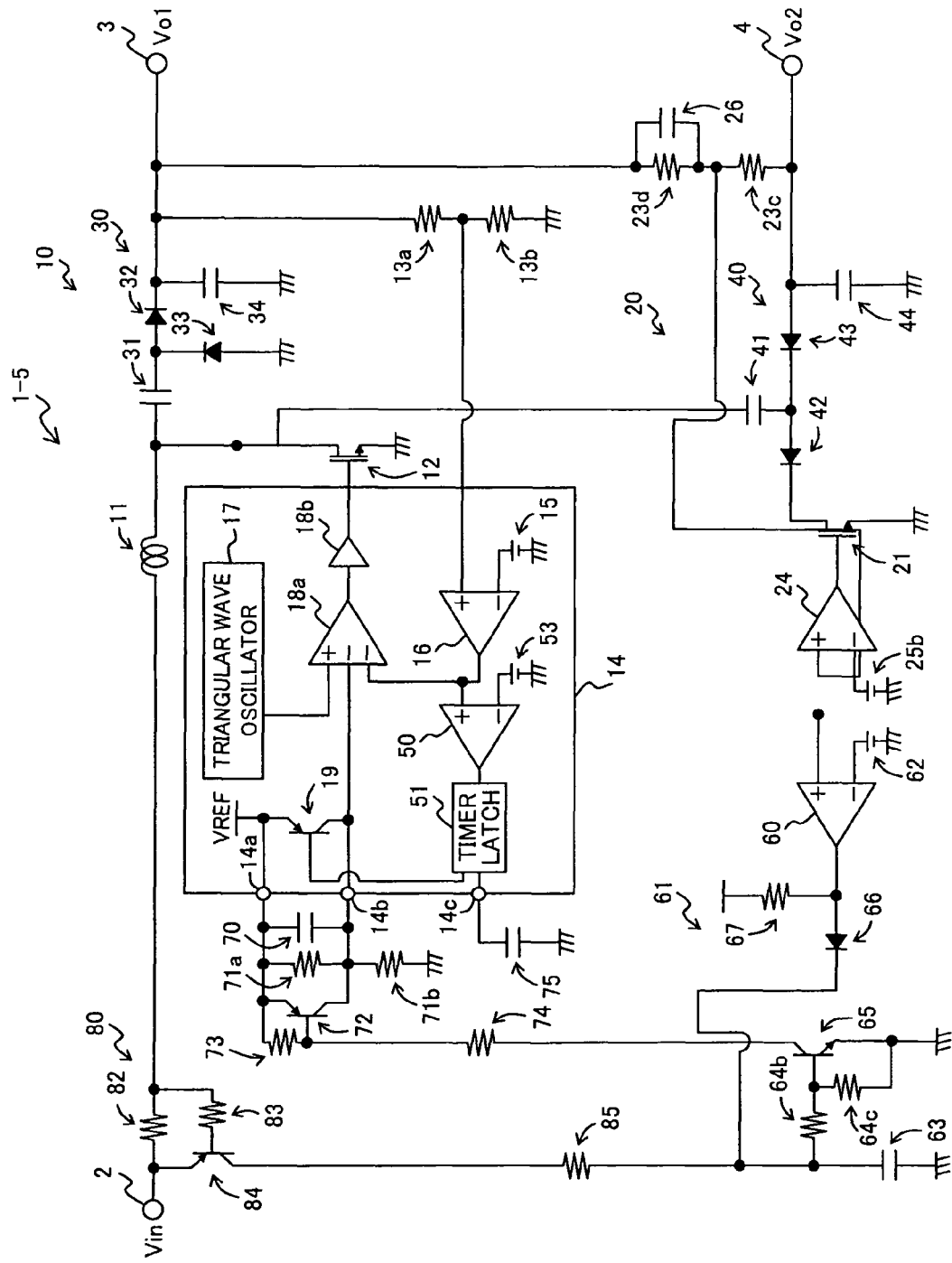
FIG. 17 is a diagram for illustrating circuit configuration of the positive/negative voltage output circuit according to the fifth embodiment of this invention.

FIG. 17 shows a detailed circuit configuration of the positive/negative voltage output circuit 1-5. In FIG. 17, parts corresponding to the function blocks shown in FIG. 16 are designated by the same reference characters.

The excess current detection circuit 80 has a resistor 82 disposed between the input terminal 2 and the coil 11, a resistor 83 disposed in parallel to the resistor 82, and a switch 84 and a resistor 85 both disposed between a connection point connecting the input terminal 2 to the resistor 82 and the capacitor 63 of the timer 61.

The switch 84 is connected to the resistor 83, and is turned ON when the voltage drop of the resistor 82 increases due to an increase in the input voltage.

The resistor 83 is a protection resistor which prevents the switch 84 from breaking due to flow of an excess current to the base of the switch 84.

The timer 61 has a diode 66 between the comparator 60 and the capacitor 63, and a resistor 67 connected to a connection point between the comparator 60 and the diode 66. The diode 66 is a diode for reverse-current prevention which prevents the current from the resistor 85 from flowing into the resistor 67 or the comparator 60 in case of excess current.

With such configuration, when the input voltage from the input terminal 2 is increased to turn ON the switch 84, the capacitor 63 is charged by the resistor 85, and the switches 65 and 72 are turned ON when the voltage climes to the specified value.

As described before with reference to FIG. 15, the voltage at the DT terminal 14b in the controller 14 increases to near the VREF to make the PWM control circuit 18 turn ON the first switch 12, the positive voltage output is hence decreased. This makes the output short-circuit detection circuit 50 and the timer latch circuit 51 (that is, the output short-circuit protection circuit of a timer latch type) operate to latch the first switch 12 onto the ON state, thereby to protect the positive/negative voltage output circuit 1-5.

A timer period (predetermined time) of the timer 61 at the time of excess current detection by the excess current detection circuit 80 is determined by the resistor 85 and the capacitor 63. A timer period at the time of output short-circuit detection of the negative voltage output by the voltage abnormality detector 60 in the negative voltage output circuit 20 is determined by the resistor 67 and the capacitor 63.

The positive/negative voltage output circuit 1-5 according to the fifth embodiment of this invention can provide the same working effects as the positive/negative voltage output circuit 1-4 according to the aforementioned fourth embodiment. In addition, since the positive/negative voltage output circuit 1-5 has the excess current detection circuit 80 and the timer 61 detects that excess current detection by the excess current detection circuit 80 continues for a predetermined time, excess current of the input current flowing in from the input terminal 2 can be prevented by turning OFF the first switch 12 by the PWM control circuit 18 in order to protect the positive/negative voltage output circuit 1-5 with certainty.

[6] Modifications

Note that the present invention is not limited to the above examples, but may be modified or combined in various ways without departing from the spirit and scope of the invention.

For example, the positive/negative voltage output circuit 1-4 or 1-5 according to the fourth or fifth embodiment is configured by providing the output short-circuit detection circuit 50, the timer latch circuit 51, the OR circuit 52, the voltage abnormality detection circuit 60, the timer 61, the excess current detection circuit 80 and the OR circuit 81 to the positive/negative voltage output circuit 1-3 according to the third embodiment. However, this invention is not limited to this. But, the output short-circuit detection circuit 50, the timer latch circuit 51, the OR circuit 52, the voltage abnormality circuit 60, the timer 61, and the excess current detection circuit 80 and the OR circuit 81 may be provided to the positive/negative voltage output circuit 1-1 or 1-2 according to the first or second embodiment as done to the third embodiment to attain the fourth and fifth embodiments.

Figure 18:
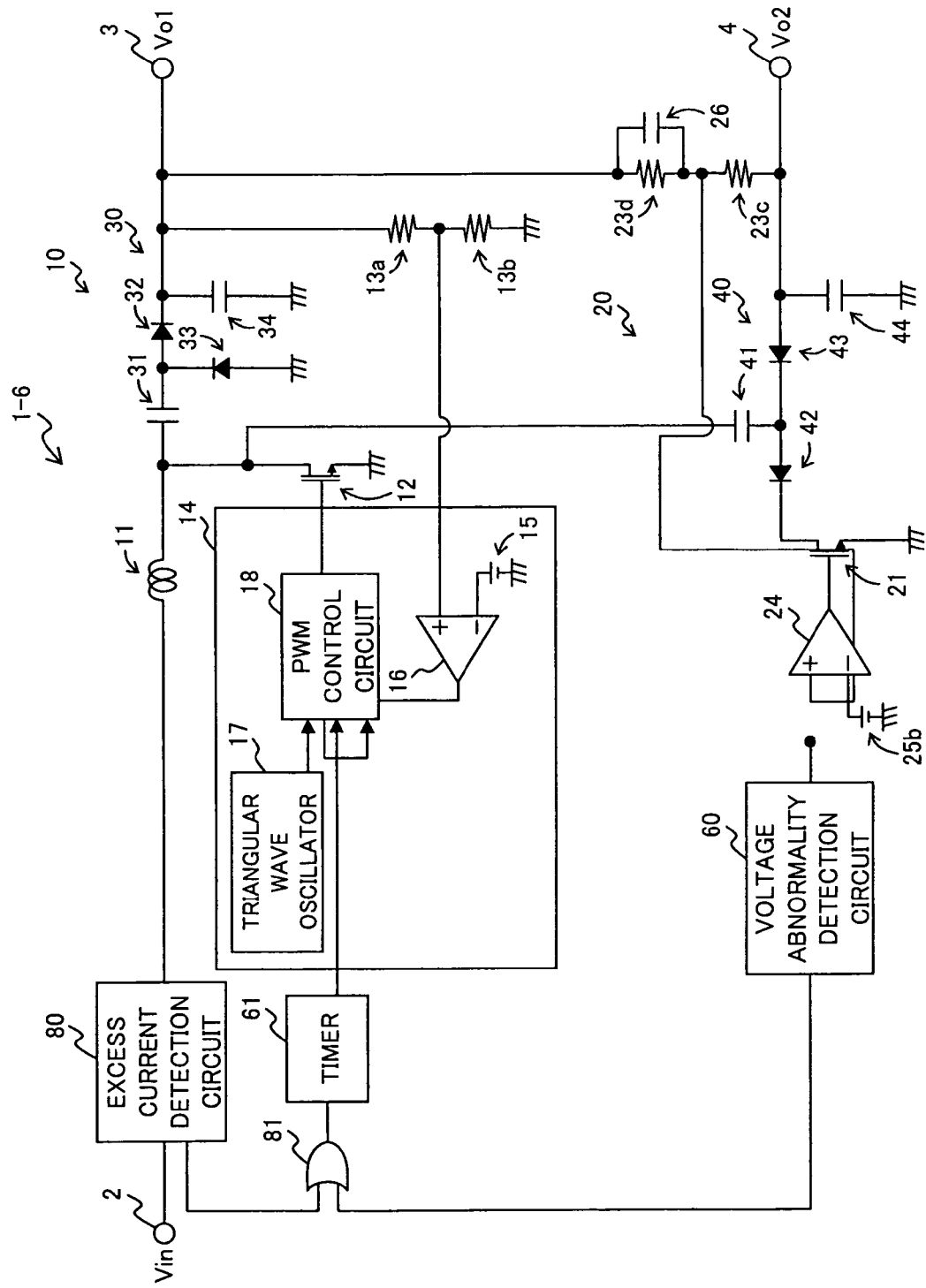
FIG. 18 is a diagram for illustrating configuration of a positive/negative voltage output circuit according to a modification of this invention.

In the above example, the positive/negative voltage output circuit 1-5 according to the fifth embodiment has the function of protecting itself from an output short-circuit of the positive voltage output. However, this invention is not limited to this example. For example, as shown in FIG. 18, the positive/negative voltage output circuit 1-6 may dispense with the output short-circuit detection circuit 50 and the timer latch circuit 51. If doing so, the first switch 12 is not latched onto the OFF state, which enables the controller 14 to restore by itself to the switching control on the first switch 12 when the output short-circuit is recovered, even if the first switch 12 is turned OFF due to detection of the output short-circuit of the negative voltage output.

Figure 19:
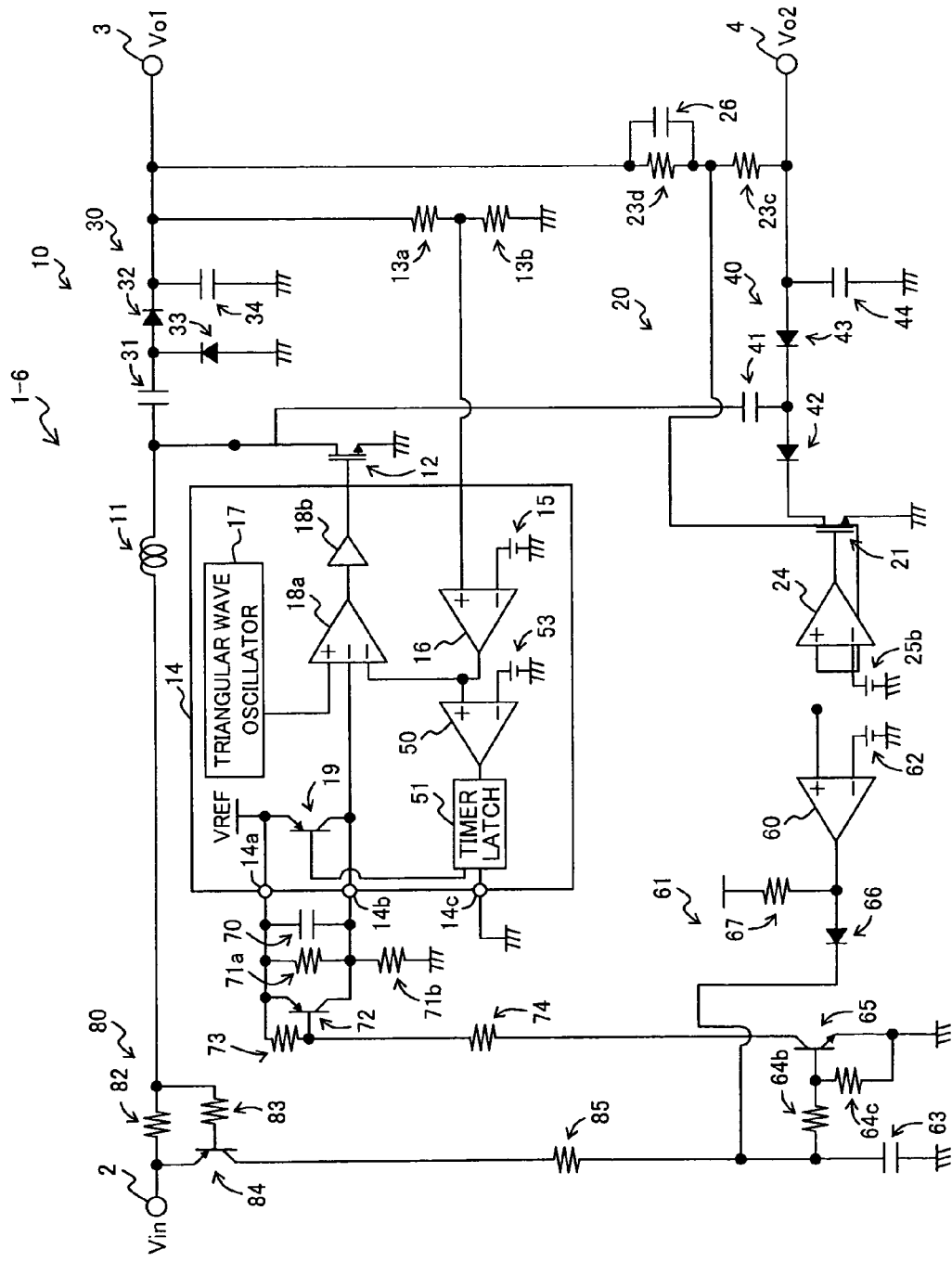
FIG. 19 is a diagram for illustrating an example of circuit configuration of the positive/negative voltage output circuit as a modification of the invention shown in FIG. 18.

When the controller 14 has a protection circuit of timer latch type (that is, the output short-circuit detection circuit 50 and the timer latch circuit 51) in a positive/negative voltage output circuit 1-6 as shown in FIG. 19, the timer latch function of the timer latch circuit 51 can be disabled by grounding the SCP terminal 14c.

[7] Others

Each of the positive/negative voltage output circuits 1-1 to 1-6 according to the first to fifth embodiments and the modifications is partly or all built in an integrated circuit. In other words, an integrated circuit according to this invention has part or all of the positive/negative voltage output circuit 1-1, . . . or 1-6. For example, as shown in FIG. 20, an integrated circuit 90 according to an embodiment of this invention comprises the first switch 12, the controller 14, the second switch 21, the reference voltage 25b, the voltage abnormality detection circuit 60, the timer 61, the excess current detection circuit 80 and the OR circuit 81 of the positive/negative voltage output circuit 1-5.

Figure 20:
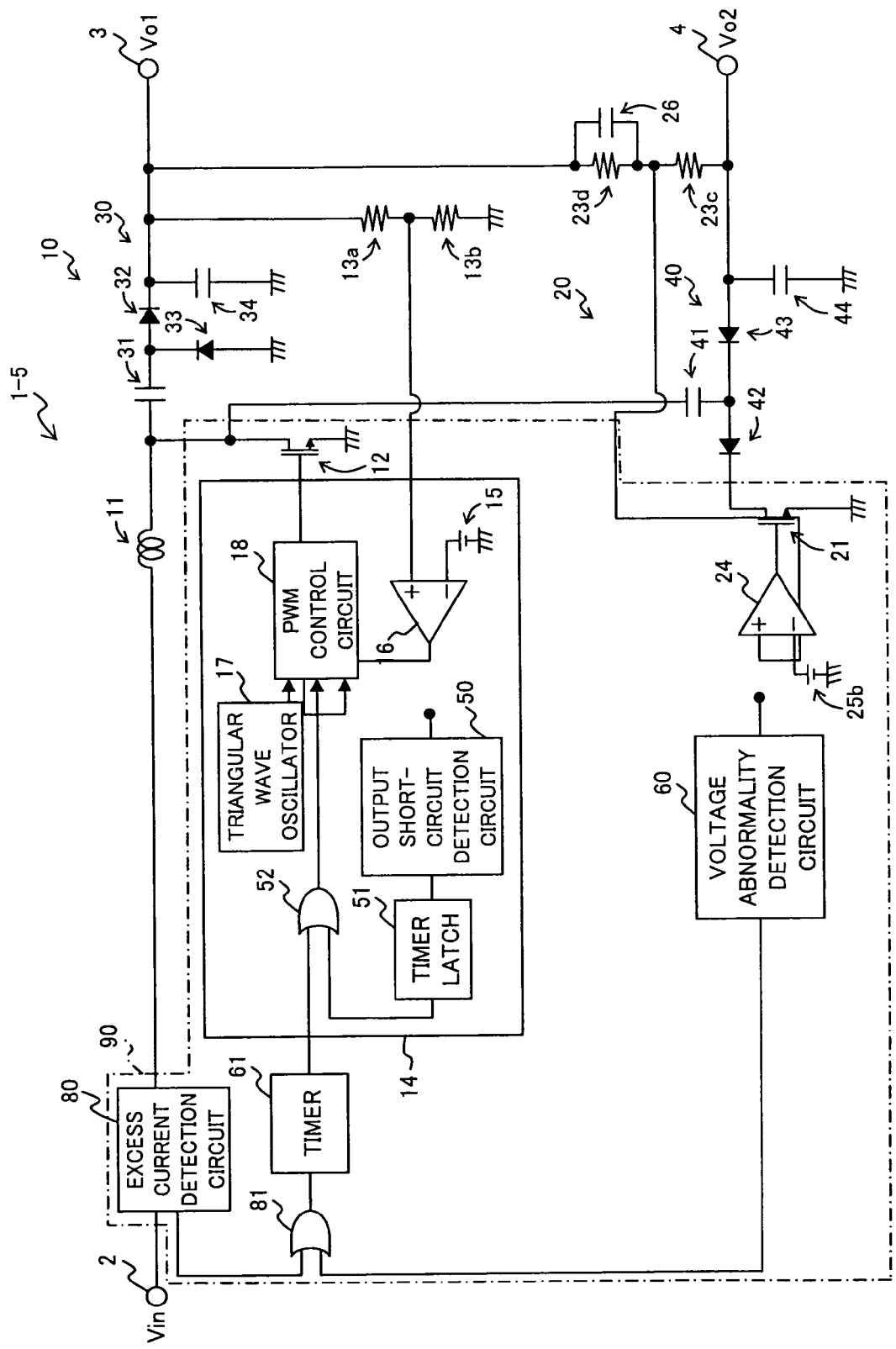
FIG. 20 is a diagram for illustrating an integrated circuit according to an embodiment of this invention.

Note that the integrated circuit 90 of this invention is not limited to the example shown in FIG. 20, but may dispense with the first switch 12 and the second switch 21 which are power elements, or may have other built-in parts such as resistors 13a, 13b, 23c, 23d, etc.

The positive/negative voltage output circuits 1-1 to 1-6 according to the first to fifth embodiment and the modifications each is mounted in an electronic device (for example, vehicle-mounted audio system, vehicle-mounted navigation system).

Namely, the electronic device according to this invention has the aforementioned positive/negative voltage output circuit 1-1, 1-2, . . . or 1-6 or the above-mentioned integrated circuit 90, which is operated with the positive voltage output (here, Vo1) outputted from the positive voltage output terminal 3 of the positive voltage output circuit 1-1, 1-2, . . . or 1-6 and the negative voltage output (here, Vo2) outputted from the negative voltage output terminal 4 as a power source.

Figure 21:
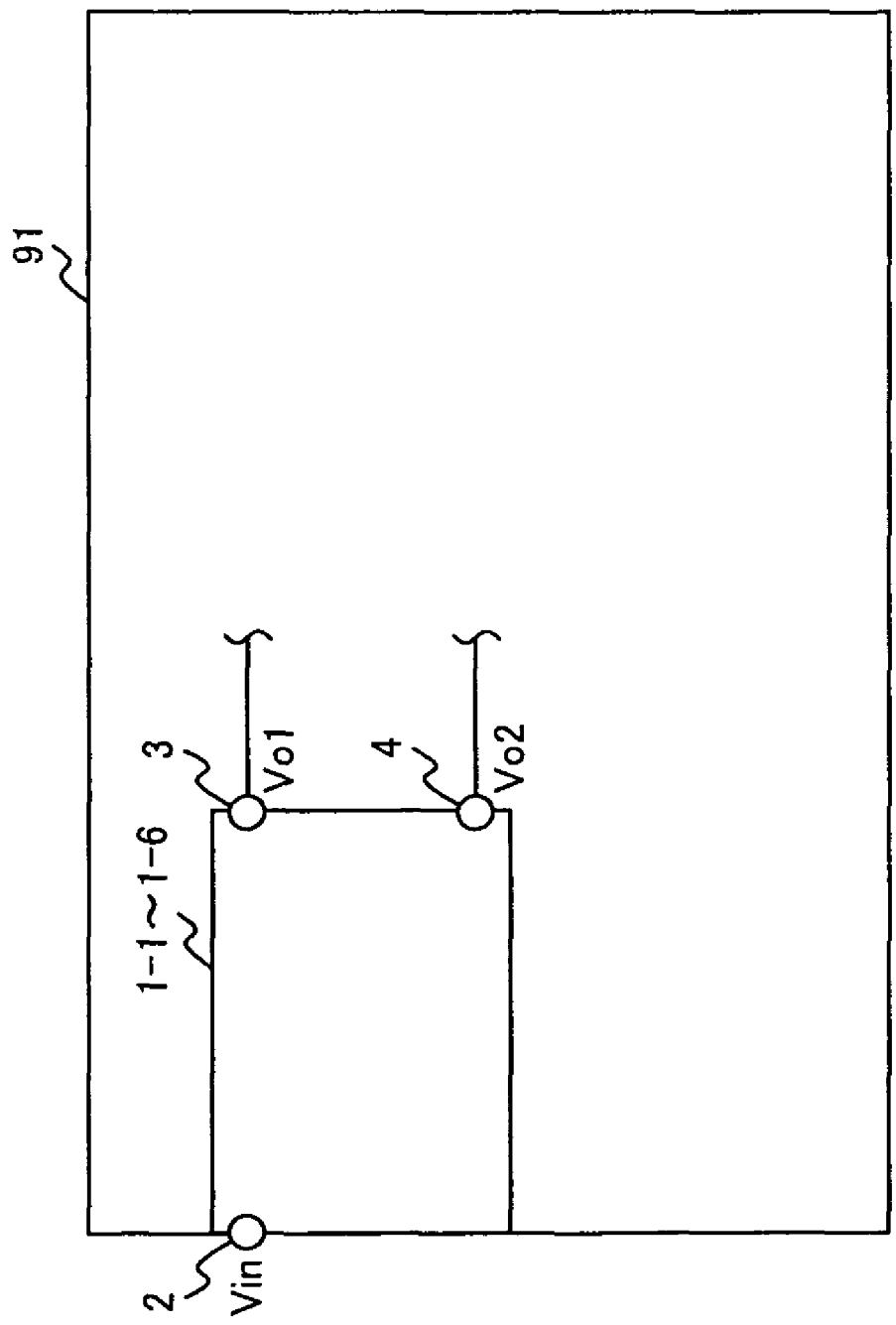
FIG. 21 is a diagram for illustrating an electronic device according to an embodiment of this invention.
Figure 22:
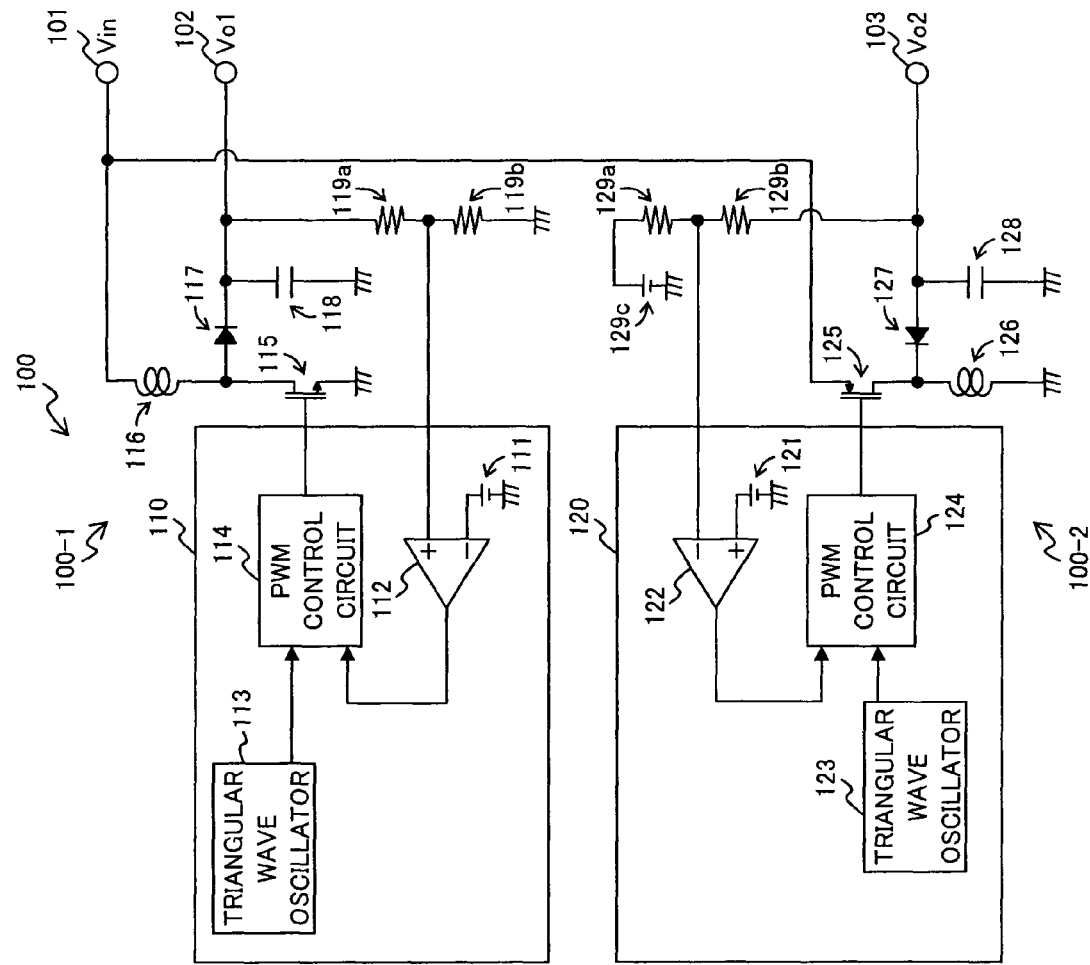
FIG. 22 is a diagram for illustrating configuration of a known positive/negative voltage output circuit.

For example, as shown in FIG. 21, an electronic device 91 according to an embodiment of this invention has the positive/negative voltage output circuit 1-1, 1-2, . . . or 1-6.

What is claimed is:

1. A voltage output circuit outputting a first voltage and a second voltage based on an input voltage inputted from an input terminal, comprising:
   a coil disposed between the input terminal and two output terminals which are a first voltage output terminal outputting the first voltage and a second voltage output terminal outputting the second voltage, respectively;
   a first charge pump circuit disposed between the coil and the first voltage output terminal, and transforming the input voltage to output the transformed input voltage as the first voltage;
   a first switch disposed between a ground and a connection point connecting the coil to the first charge pump circuit, and switching between ON and OFF of the transformation by the first charge pump circuit;
   a controller that controls the switching between ON and OFF of the first switch in order to turn the first voltage to be outputted from the first voltage output terminal into a desired value;
   a second charge pump circuit disposed between the second voltage output terminal and a connection point connecting the coil to the first switch, and transforming the input voltage by using a stored electric power according to ON/OFF of the first switch to output the transformed input voltage as the second voltage;
   a second switch disposed between the second charge pump circuit and a ground, and selecting whether or not to store the electric power to be used to transform the voltage in the second charge pump circuit; and
   a switching unit that switches between ON and OFF of the second switch based on the second voltage outputted from the second voltage output terminal.

2. The voltage output circuit according to claim 1, wherein the first charge pump circuit outputs a positive voltage obtained by boosting the input voltage as the first voltage, while the second charge pump circuit outputs a negative voltage obtained by dropping the input voltage as the second voltage.

3. The voltage output circuit according to claim 2, wherein the first charge pump circuit has a first capacitor storing an electric power so as to boost the input voltage by using the electric power stored in the first capacitor;
   the second charge pump circuit has a second capacitor storing an electric power so as to drop the input voltage by using the electric power stored in the second capacitor; and
   a capacity value of the second capacitor is greater than a capacity value of the first capacitor.

4. The voltage output circuit according to claim 1, wherein the switching unit performs the switching between ON and OFF of the second switch based on a resistance division value at a connection point between two resistors disposed in series between the first voltage output terminal and the second voltage output terminal.

5. The voltage output circuit according to claim 4, wherein a capacitor is disposed in parallel to one of the two resistors which is disposed on the side of the first voltage output terminal.

6. The voltage output terminal according to claim 1, further comprising:
   a second voltage abnormality detector that detects second voltage abnormality based on the second voltage outputted from the second voltage output terminal; and
   a first timer that detects that the second voltage abnormality detector continuously detects the second voltage abnormality for a predetermined time;
   wherein the controller switches OFF the first switch when the first timer detects that the second voltage abnormality detector continuously detects the second voltage abnormality for the predetermined time.

7. The voltage output circuit according to claim 6 further comprising:
   an excess current detector that detects excess current from the first input terminal;
   wherein the first timer detects that the excess current detector continuously detects the excess current for a predetermined time; and
   the controller switches OFF the first switch when the first timer detects that the excess current detector continuously detects the excess current for the predetermined time.

8. The voltage output circuit according to claim 6, further comprising:
   a first voltage output short-circuit detector that detects first voltage output short-circuit based on the first voltage outputted from the first voltage output terminal; and
   a second timer that detects elapse of a predetermined time when the first voltage output short-circuit detector detects the first voltage output short-circuit;
   wherein the controller latches the first switch onto an OFF state when the second timer detects elapse of the predetermined time after the first voltage output short-circuit detector detects the first voltage output short-circuit.

9. An integrated circuit comprising part or all of the voltage output circuit defined in claim 1.

10. An electronic device comprising the voltage output circuit defined in claim 1.

* * * * *